(12) United States Patent
Matsumoto et al.

(10) Patent No.: US 10,607,240 B2
(45) Date of Patent: Mar. 31, 2020

(54) ACTIVITY SITUATION ANALYSIS APPARATUS, ACTIVITY SITUATION ANALYSIS SYSTEM, AND ACTIVITY SITUATION ANALYSIS METHOD

(71) Applicant: PANASONIC INTELLECTUAL PROPERTY MANAGEMENT CO., LTD., Osaka (JP)

(72) Inventors: Yuichi Matsumoto, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1088 days.

(21) Appl. No.: 14/817,598

(22) Filed: Aug. 4, 2015

(65) Prior Publication Data

US 2016/0104174 A1 Apr. 14, 2016

(30) Foreign Application Priority Data

Oct. 8, 2014 (JP) ................................ 2014-207472

(51) Int. Cl.
*G06Q 30/02* (2012.01)
*G06K 9/00* (2006.01)
*G06Q 10/10* (2012.01)

(52) U.S. Cl.
CPC ..... *G06Q 30/0201* (2013.01); *G06K 9/00778* (2013.01); *G06Q 10/10* (2013.01)

(58) Field of Classification Search
CPC ....................... G06K 9/00771; G06Q 30/0201
See application file for complete search history.

(56) References Cited

U.S. PATENT DOCUMENTS

2005/0197923 A1* 9/2005 Kilner ................ G06K 9/00221
 382/118
2008/0114633 A1* 5/2008 Wolf ................ G06F 17/30793
 705/7.29

(Continued)

FOREIGN PATENT DOCUMENTS

EP 2924613 9/2015
EP 2991344 3/2016

(Continued)

OTHER PUBLICATIONS

The Extended European Search Report dated Mar. 17, 2016 for the related European Application No. 15180517.3.

(Continued)

*Primary Examiner* — Vincent Rudolph
*Assistant Examiner* — Raphael Schwartz
(74) *Attorney, Agent, or Firm* — Greenblum & Bernstein, P.L.C.

(57) ABSTRACT

Position information on every moving object is acquired from a moving image of a monitoring area, and activity information during every unit time is acquired from the position information on every moving object. Conditions of an observation period of time are set according to a user input operation, the observation period of time is controlled in accordance with the conditions of the observation period of time, and the activity information during every unit time is aggregated during the observation period of time to acquire the activity information during the observation period of time. An activity map image is generated from the activity information during the observation period of time, and the activity map image and the moving image of the monitoring area are generated and output at every predetermined point in time.

16 Claims, 18 Drawing Sheets

(56) References Cited

U.S. PATENT DOCUMENTS

| | | | |
|---|---|---|---|
| 2009/0134968 A1 | 5/2009 | Girgensohn et al. | |
| 2011/0028846 A1 | 2/2011 | Tsao et al. | |
| 2011/0231419 A1* | 9/2011 | Papke | G06F 17/30793 |
| | | | 707/756 |
| 2011/0284838 A1 | 11/2011 | Saito | |
| 2015/0187088 A1 | 7/2015 | Iwai et al. | |
| 2015/0278608 A1 | 10/2015 | Matsumoto et al. | |

FOREIGN PATENT DOCUMENTS

| | | |
|---|---|---|
| JP | 2009-134688 | 6/2009 |
| JP | 2010-272958 A | 12/2010 |
| JP | 2011-024883 | 2/2011 |
| JP | 2011-233133 | 11/2011 |
| JP | 2011-248836 | 12/2011 |
| JP | 2014-172778 | 9/2014 |
| JP | 2014-207472 | 10/2014 |
| JP | 5597762 B1 | 10/2014 |
| JP | 5597781 B | 10/2014 |
| JP | 5597781 B1 | 10/2014 |
| JP | 5866564 B | 2/2016 |
| WO | 2009/017687 A1 | 2/2009 |

OTHER PUBLICATIONS

Communication pursuant to Article 94(3) EPC dated May 29, 2019 for European Patent Application No. 15180517.3.
M. Parzych et al: "Automatic people density maps generation with use of movement detection analysis", 2013 6th International Conference on Human System Interactions (HSI), IEEE, Jun. 6, 2013, pp. 26-31, XP032475670.
English Translation of Chinese Search Report dated Jun. 27, 2019 for Chinese Patent Application No. 201510609441.6.

* cited by examiner

FIG. 3A
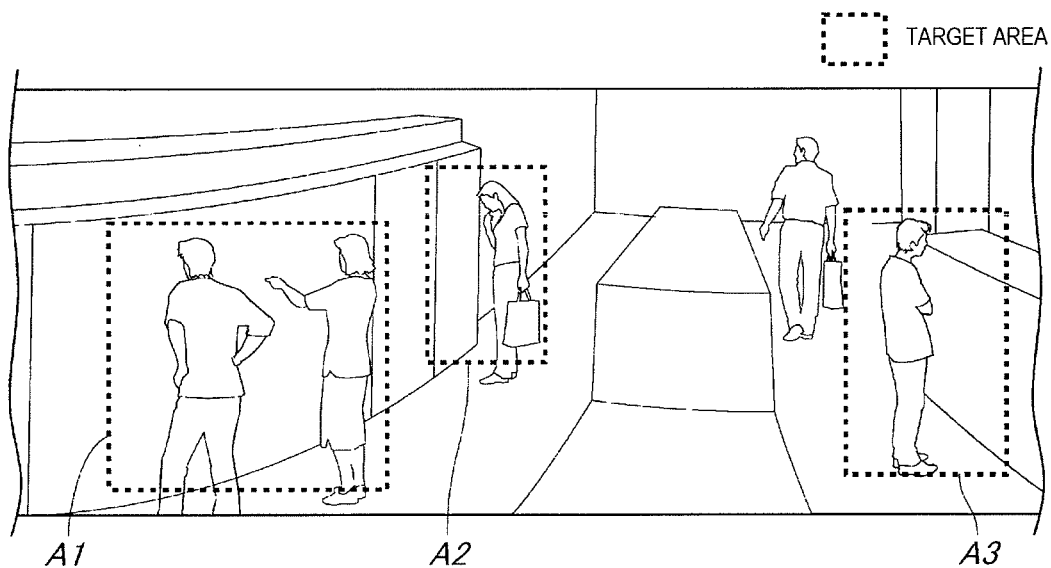
FIG. 3B
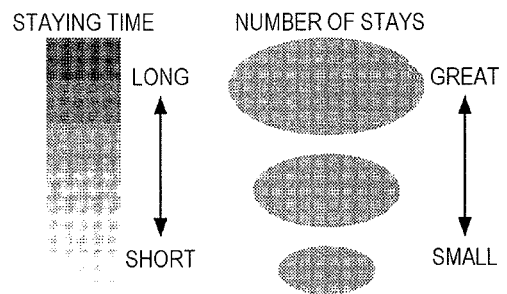
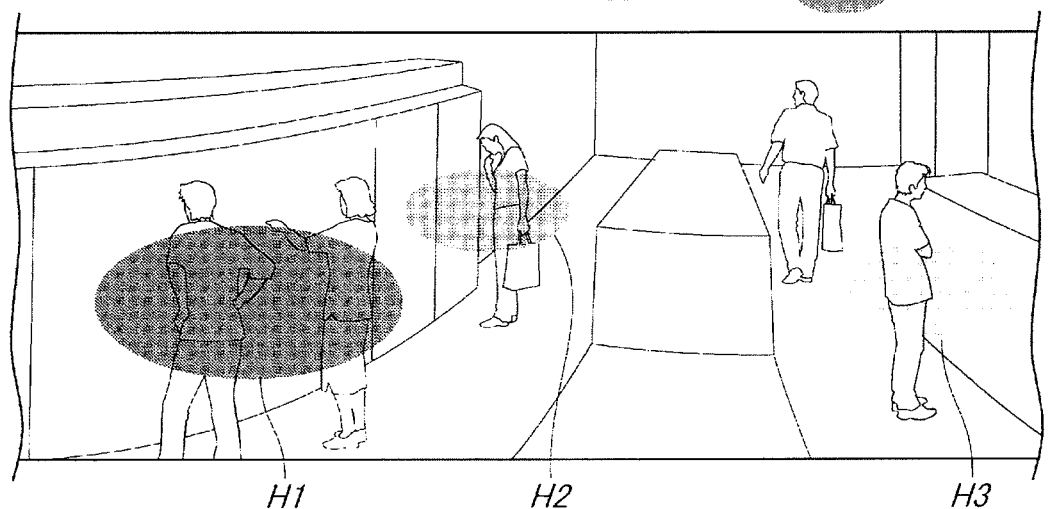

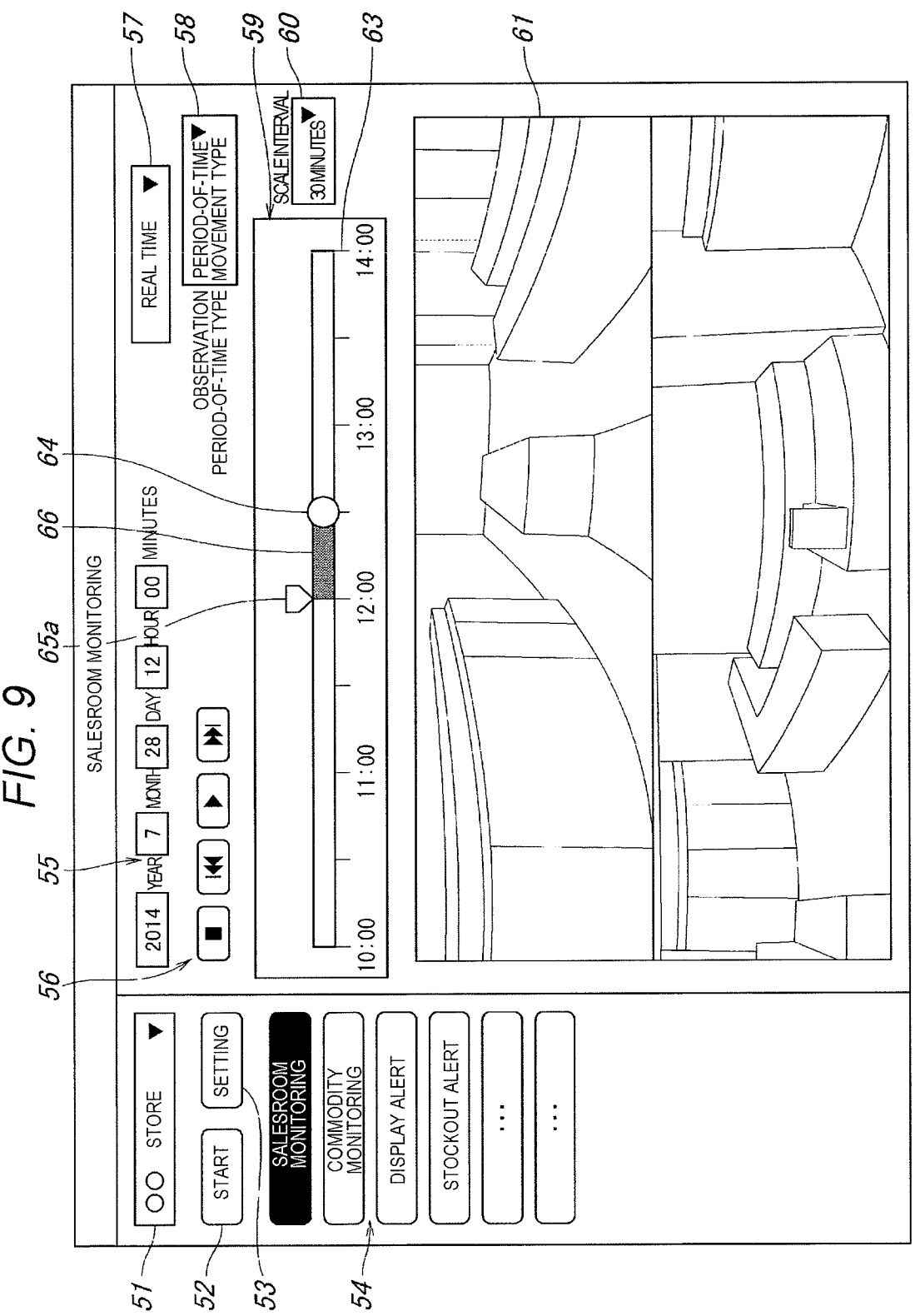

ACTIVITY SITUATION ANALYSIS APPARATUS, ACTIVITY SITUATION ANALYSIS SYSTEM, AND ACTIVITY SITUATION ANALYSIS METHOD

BACKGROUND OF THE INVENTION

1. Field of the Invention

The present invention relates to an activity situation analysis apparatus, an activity situation analysis system, and an activity situation analysis method, in each of which an activity situation of a moving object in a monitoring area is observed, an activity map image that results from visualizing the activity situation of the moving body is generated based on a result of the observation, and the generated activity map image is displayed on a display device.

2. Description of the Related Art

In a store such as a convenience store, a plan for an improvement in store management, specifically, an improvement plan for a review of types of commodities at every salesroom, a method of displaying the commodities at every salesroom, and the like, are considered based on analysis relating to a behavior of a customer within the store, but the analysis is useful for planning to achieve an improvement in customer satisfaction or efficient store management and for improving a profit of and a sales volume of the store.

On the other hand, in the store such as the convenience store, a monitoring system, in which a situation within the store is monitored using a moving image that is captured by a camera which is installed to capture a moving image of the inside of the store, has come into wide use, and when an information processing apparatus is caused to perform the analysis relating to the behavior of the customer within the store using the moving image that is captured by the camera, a task of studying the improvement plan for store management can be efficiently performed.

As a technology that performs the analysis relating to the behavior of the person using the moving image of the camera, in the related art, a technology is known that acquires the information relating to the activity situation of the person in a monitoring area from plural moving images of the camera and generates an activity map image that results from visualizing the activity situation (refer to Japanese Patent Unexamined Publication No. 2009-134688).

With this technology, the activity map image is set to be color-coded into the shape of a contour according to the extent of person activity, and is set to be displayed in a state of being superimposed onto a layout drawing of the monitoring area. Furthermore, a technology is known in which the monitoring area is divided into multiple blocks and that detects the extent to which the person stays in every block (refer to Japanese Patent Unexamined Publication No. 2011-248836). With this technology, a value (score) indicating the extent to which the person stays is set to be output in every block.

The moving image of the monitoring area is displayed and thus the user can know an actual situation within the monitoring area. However, when screen display through which how the activity situation of the person changes can be known is performed while the moving image of the monitoring area is in the middle of being displayed in this manner, the activity situation of the person in the monitoring area can be suitably known.

Particularly, a configuration is desirable in which an activity situation within the monitoring area at an attention-receiving point in time (a current point in view in real time display) and an activity situation of the person during an attention-receiving period of time can be known at the same time.

However, in Japanese Patent Unexamined Publication No. 2009-134688 and Japanese Patent Unexamined Publication No. 2011-248836, the user can know a distribution situation of the activity extent of the person within the monitoring area, that is, at which area the person is active to which extent, but there is a problem that how the activity situation of the person changes cannot be completely known without taking into consideration the desire described above, while the moving image of the monitoring area is in the middle of being displayed.

Furthermore, the activity situation of the person can be known with the activity map image, but when an analysis form of the activity situation that is to be applied when the activity map image is generated, particularly, conditions relating to the observation period of time that is to be applied when the activity information that is a source of the activity map image is generated can be set to be variously changed, the activity situation of the person in the monitoring area can be known from various points of view, thereby improving user's convenience. Because of this, a configuration is desirable in which customization that variously changes the analysis form of the activity situation according to a user need can be easily performed.

SUMMARY OF THE INVENTION

An activity situation analysis apparatus according to an aspect of the invention observes an activity situation of a moving object in a monitoring area, generates an activity map image that results from visualizing the activity situation of the moving object based on a result of the observation, and displays the generated activity map image on a display device. The activity situation analysis apparatus includes: a position information acquirer that detects the moving object from a moving image of the monitoring area and acquires position information on every moving object; an activity information acquirer that acquires activity information based on the position information on every moving object; an observation condition setter that sets conditions relating to an observation period of time for observing activity situation of the moving object according to a user input operation; an observation-period-of-time controller that controls the observation period of time in accordance with the conditions relating to the observation period of time that is set by the observation condition setter; an activity information aggregator that aggregates the activity information based on the observation period of time that is controlled by the observation-period-of-time controller, and acquires the activity information during the observation period of time; an activity map image generator that generates the activity map image based on the activity information during the observation period of time; and an output controller that generates a monitoring moving image including the activity map image and the moving image of the monitoring area at every predetermined point in view, and outputs the generated monitoring moving image to the display device.

BRIEF DESCRIPTION OF DRAWINGS

FIG. 3A is an explanatory diagram for describing an outline of processing that is performed on a PC;

FIG. 3B is an explanatory diagram for describing an outline of the processing that is performed on the PC;

FIG. 9 is an explanatory diagram illustrating a monitoring screen that is displayed on a monitor;

DETAILED DESCRIPTION OF THE PREFERRED EMBODIMENTS

Figure 1:
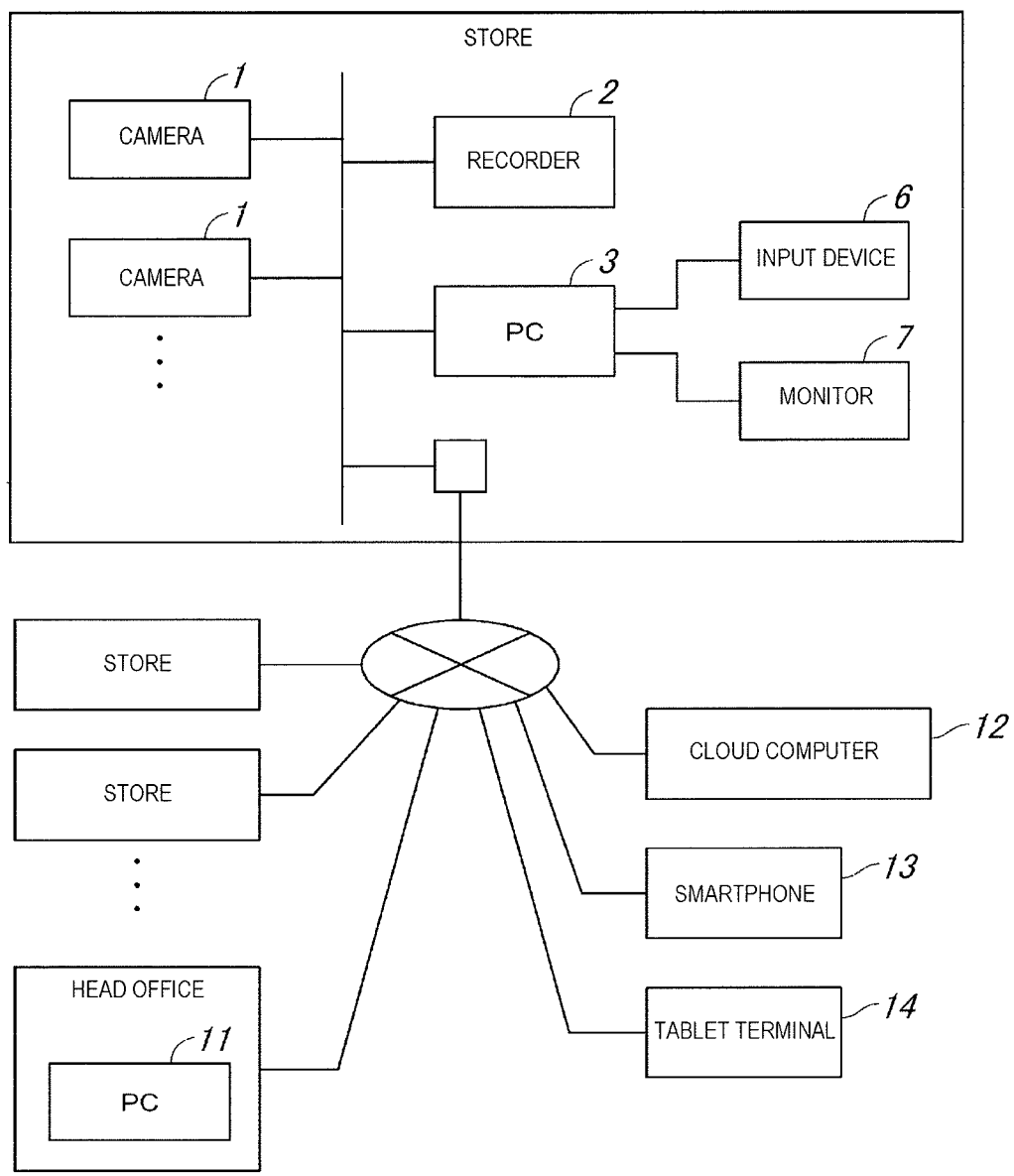
FIG. 1 is a configuration diagram of an entire activity situation analysis system according to a first embodiment.

A main object of the present invention, which is made to resolve the problems with the technologies in the related art, is to provide an activity situation analysis apparatus, an activity situation analysis system and an activity situation analysis method, each of which is configured in such a manner that a user can easily know how an activity situation of a moving object changes while a moving image of a monitoring area is being displayed and customization that variously changes an analysis form of the activity situation according to a user need can be easily performed.

According to a first invention, there is provided an activity situation analysis apparatus that observes an activity situation of a moving object in a monitoring area, generates an activity map image that results from visualizing the activity situation of the moving object based on a result of the observation, and displays the activity map image on a display device, the activity situation analysis apparatus being configured to include; a position information acquirer that detects the moving object from a moving image of the monitoring area and acquires position information on every moving object; an activity information acquirer that acquires activity information based on the position information on every moving object; an observation condition setter that sets a condition relating to an observation period of time for observing the activity situation of the moving object according to a user input operation; an observation-period-of-time controller that controls the observation period of time in accordance with the conditions relating to the observation period of time that is set by the observation condition setter; an activity information aggregator that aggregates the activity information based on the observation period of time that is controlled by the observation-period-of-time controller and acquires activity information during the observation period of time; an activity map image generator that generates the activity map image based on the activity information during the observation period of time; and an output controller that generates a monitoring moving image including the activity map image and the moving image of the monitoring area at every predetermined point in time and outputs the generated monitoring moving image to the display device.

Accordingly, because the monitoring moving image including the activity map image and the moving image of the monitoring area is generated at a predetermined point in time and the generated monitoring moving image is output, while the moving image of the monitoring area is in the middle of being displayed, the user can easily know how the activation situation of the moving object changes. Furthermore, because the observation period of time is controlled in accordance with the conditions that are set according to the user input operation, the customization that variously changes the analysis form of the activity situation according to the user's need can be easily performed.

Furthermore, according to a second invention, the output controller may be configured to generate the monitoring moving image that results from superimposing the activity map image on the moving image of the monitoring area and to output the generated monitoring moving image.

Accordingly, the user can immediately know an actual situation of and the activity situation of the moving object in an attention-receiving area within the monitoring area.

Furthermore, according to a third invention, the observation-period-of-time controller may be configured to control an observation period of time in such a manner that, according to the progress of a display point in time of the moving image of the monitoring area, the observation period of time is moved following the display point in time.

Accordingly, with the activity map image, the user can know the activity situation of the moving object during a period of time that is based on the display point in time of the moving image of the monitoring area. When a display point in time progresses, the observation period of time is moved, and the activity information during the observation period of time is updated, but at this time, processing is only performed that excludes and integrates activity information that is equivalent to a difference between a new observation period of time and the previous observation period of time from and into the activity information during the previous observation period of time, and thus activity information during the new observation period of time can be acquired. Because of this, an arithmetic operation load can be reduced.

Furthermore, according to a fourth embodiment, the observation-period-of-time controller may be configured to control the observation period of time in such a manner that, based on a setting length of the observation period of time that is set by the observation condition setter, a period of time that is by the setting length of the observation period of time earlier than the display point in time of the moving image of the monitoring area is the observation period of time.

Accordingly, with the activity map image, the user can know the activity situation of the moving object during the period of time immediately before the moving image of the monitoring area.

Furthermore, according to a fifth invention, the observation-period-of-time controller may be configured to control the observation period of time in such a manner that a period of time from a display starting point in time to the display point in time is the observation period of time until an elapsed period of time from the display starting point in time of the moving image of the monitoring area to the display point in time reaches the setting length of the observation period of time.

Accordingly, because past information at an earlier time than the display starting point in time of the moving image of the monitoring area is not included in the activity map image, the user can suitably know the activity situation of the moving object for a period of time at an attention-receiving point in time or later.

Furthermore, according to a sixth invention, the observation-period-of-time controller may be configured to control the observation period of time in such a manner that, based on a setting range of the observation period of time, which is set by the observation condition setter, within the setting range of the observation period of time, a period of time from the display starting point in time of the moving image of the monitoring area, which is a starting point of the observation period of time, to a display point in time is the observation period of time.

Accordingly, with the activity map image, the user can know the activity situation of the moving object that occurs after displaying of the moving image of the monitoring area is started. When the display point in time progresses, the observation period of time is moved, and the activity information during the observation period of time is updated, but at this time, activity information that is equivalent to a difference between the previous observation period of time and a new observation period of time is only integrated into the activity information during the previous observation period of time, and thus activity information during the new observation period of time can be acquired. Because of this, an arithmetic operation load can be reduced.

Furthermore, according to a seventh invention, the observation condition setter may be configured to set the length of or the range of the observation period of time according to the user input operation that arbitrarily designates the length of or the range of the observation period of time as conditions of the observation period of time.

Accordingly, because the user can arbitrarily designate the length of or the range of the observation period of time, a customization attribute that changes the analysis form of the activity situation can be improved.

Furthermore, according to an eighth invention, the output controller may be configured to generate and output in real time the monitoring moving image including the activity map image and a current moving image of the monitoring area.

Accordingly, the user can browse through the activity map image and the current moving image of the monitoring area in real time.

Furthermore, according to a ninth invention, the activity situation analysis apparatus may be configured to further include a unit time setter that sets a unit time relating to the acquisition of the activity information according to the user input operation, and in the activity situation analysis apparatus, the activity information acquirer may be configured to acquire the activity information during every unit time based on the unit time that is set by the unit time setter.

Accordingly, because the user can designate the unit time, the customization attribute that changes the analysis form of the activity situation can be improved.

Furthermore, according to a tenth invention, the activity information may be configured to include information relating to at least either of the number of stays that is the number of moving objects that stay in an observation area that is set to be within the monitoring area and a staying time that is a time for which the moving object stays within the observation area.

Accordingly, because with the activity, the user can know the number of stays or the staying time in the observation area using the activity map image, the user can suitably know the activity situation (a staying situation) of the moving object.

Furthermore, according to an eleventh invention, there is provided an activity situation analysis system that observes an activity situation of a moving object in a monitoring area, generates an activity map image that results from visualizing the activity situation of the moving object based on a result of the observation, and displays the activity map image on a display device, the activity situation analysis system being configured to include; a camera that captures a moving image of the monitoring area; and multiple information processing apparatuses, in which any one of the multiple information processing apparatuses includes a position information acquirer that detects the moving object from the moving image of the monitoring area and acquires position information on every moving object, an activity information acquirer that acquires activity information based on the position information on every moving object, an observation condition setter that sets a condition relating to an observation period of time for observing the activity situation of the moving object according to a user input operation, an observation-period-of-time controller that controls the observation period of time in accordance with the conditions of the observation period of time that is set by the observation condition setter, an activity information aggregator that aggregates the activity information based on the observation period of time that is controlled by the observation-period-of-time controller and acquires activity information during the observation period of time, an activity map image generator that generates the activity map image based on the activity information during the observation period of time, and an output controller that generates a monitoring moving image including the activity map image and the moving image of the monitoring area at every predetermined point in time and outputs the generated monitoring moving image to the display device.

Accordingly, as is the case with the first invention, while the moving image of the monitoring area is being displayed, the user can easily know how the activity situation of the moving object changes, and can easily perform the customization that variously changes the analysis form of the activity situation according to the user's need.

Furthermore, according to a twelfth invention, there is provided an activity situation analysis system that observes an activity situation of a moving object in a monitoring area, generates an activity map image that results from visualizing the activity situation of the moving object based on a result of the observation, and displays the activity map image on a display device, the activity situation analysis system being configured to include; a camera that captures a moving image of the monitoring area; and an information processing apparatus, in which any one of the camera and the information processing apparatus includes a position information acquirer that detects the moving object from the moving image of the monitoring area and acquires position information on every moving object, an activity information acquirer that acquires activity information based on the position information on every moving object, an observation condition setter that sets a condition relating to an observation period of time for observing the activity situation of the moving object according to a user input operation, an observation-period-of-time controller that controls the observation period of time in accordance with the conditions of the observation period of time that is set by the observation condition setter, an activity information aggregator that aggregates the activity information based on the observation period of time that is controlled by the observation-period-of-time controller and acquires activity information during the observation period of time, an activity map image generator that generates the activity map image based on the activity information during the observation period of time, and an output controller that generates a monitoring moving image including the activity map image and the moving image of the monitoring area at every predetermined point in time and outputs the generated monitoring moving image to the display device.

Accordingly, as is the case with the first invention, while the moving image of the monitoring area is being displayed, the user can easily know how the activity situation of the moving object changes, and can easily perform the customization that variously changes the analysis form of the activity situation according to the user's need.

Furthermore, according to a thirteenth invention, there is provided an activity situation analysis method of causing an information processing apparatus to perform processing that observes an activity situation of a moving object in a monitoring area, generates an activity map image that results from visualizing the activity situation of the moving object based on a result of the observation, and displays the activity map image on a display device, the activity situation analysis method being configured to include: detecting the moving object from a moving image of the monitoring area and acquiring position information on every moving object; acquiring activity information based on the position information on every moving object; setting a condition relating to an observation period of time for observing the activity situation of the moving object according to a user input operation; controlling the observation period of time in accordance with the conditions relating to the observation period of time that is set in the setting of the condition relating to the observation period of time; aggregating the activity information based on the observation period of time that is controlled in the controlling of the observation period of time and acquiring activity information during the observation period of time; generating the activity map image based on the activity information during the observation period of time; and generating a monitoring moving image including the activity map image and the moving image of the monitoring area at every predetermined point in time and outputting the generated monitoring moving image to the display device.

Accordingly, as is the case with the first invention, while the moving image of the monitoring area is being displayed, the user can easily know how the activity situation of the moving object changes, and can easily perform the customization that variously changes the analysis form of the activity situation according to the user's need.

Embodiments of the present invention will be described below referring to the drawings.

First Embodiment

FIG. 1 is a configuration diagram of an entire activity situation analysis system according to a first embodiment. The activity situation analysis system is established for a retail chain store such as a convenience store, and includes camera 1, recorder (a moving image storage) 2, and PC (an activity situation analysis apparatus) 3.

Camera 1 is installed at a suitable place within a store (a facility). A moving image of the inside of the store is captured by camera 1, and the moving image obtained by this is stored in recorder 2.

Input device 6 on which a user such as a store manager performs various input operations, such as a mouse, and monitor (a display device) 7 on which a monitoring screen is displayed are connected to PC 3. With the monitoring screen that is displayed on monitor 7, the user can browse through moving images of the inside of the store, which are captured by camera 1, in real time and can browse through past moving images of the inside of the store, which were recorded in recorder 2.

Furthermore, camera 1, recorder 2, and PC 3 are installed in each of the multiple stores, and PC 11 is installed in a head office that generally manages the multiple stores. On PC 11, the moving images of the inside of the store that are captured with camera 1 can be browsed through in real time, the past moving images of the inside of the store that were recorded in recorder 2 can be browsed through, and thus, a situation of the inside of the store can be checked in the head office.

According to the present embodiment, PC 3 installed in the store is configured as an activity situation analysis apparatus that performs analysis relating to an activity situation of a customer within the store. Analysis result information generated on PC 3 can be browsed through on PC 3 by a user on the store side, for example, a store manager, is transmitted to PC 11 installed in a head office and thus can also be browsed through on PC 11 by a user on the head office side, for example, a supervisor who provides guidance or a proposal to each of the stores within a district of which the supervisor is in charge. Furthermore, PCs 3 and 11 are configured as browsing apparatuses in which the analysis result information is browsed through.

Figure 2:
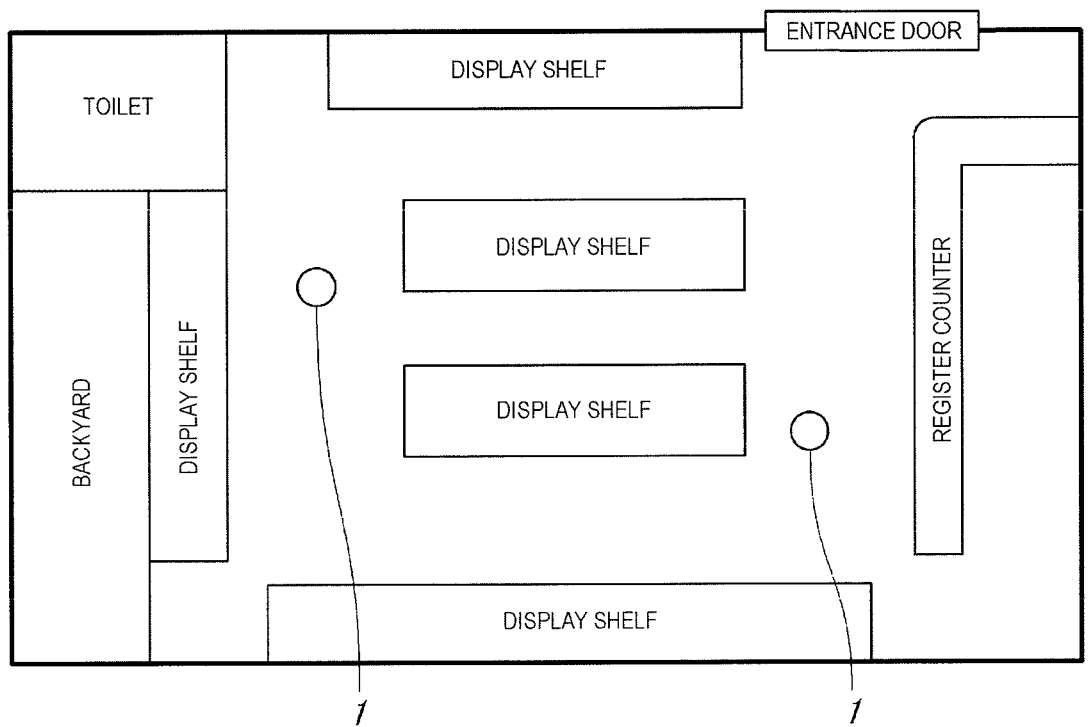
FIG. 2 is a top-view diagram for describing a store layout and an installation situation of a camera.

Next, a store layout and an installation state of camera 1 are described. FIG. 2 is a top-view diagram for describing the store layout and the installation situation of camera 1.

In the store, an entrance door, display shelves, a check-out counter, and the like are installed. The display shelves are installed in a state of being categorized according to types of commodities such as a Japanese box lunch, a PET bottle, and a rice ball. A customer enters the store through the entrance door, and moves along a passage between the display shelves within the store. When the customer finds a commodity that he/she wants to purchase, he/she picks it up and moves to a register counter. After making payment on account (paying for the commodity) at the register counter, the customer leaves the store through the entrance door.

Furthermore, in the store, multiple cameras 1 that capture moving images of the inside (the monitoring area) of the store are installed. The camera is installed in a suitable position on the ceiling of the store. Particularly, in an example that is illustrated in FIG. 2, as camera 1, an omnidirectional camera with a fish-eye lens that has a photographing range of 360 degrees is adopted, and with this camera 1, images of persons that enter and leave the store through the entrance door, images of persons that are present within the store, and moving images of commodities and the like on the display shelves can be captured.

Next, an outline of processing that is performed on PC 3 that is illustrated in FIG. 1 is described. FIGS. 3A and 3B are explanatory diagrams for describing the outline of the processing that is performed on PC 3.

As illustrated in FIG. 3A, persons who stop in front of the display shelves and determine the merits of each commodity, persons who shop around to find the commodities that they want to buy, or the like are shown in a moving image that is captured by camera 1. Here, the persons who stop in front of the display shelves to determine the merits of the commodities do not move in front of the display shelves for a predetermined period of time or longer, and thus are in a state where they stay in front of the display shelves. The activity situation (staying situation) of the person in front of the display shelf indicates the extent to which the customer is interested in the commodity on the display shelf, and is useful for considering an improvement plan for store management, that is, an improvement plan for a review of types of commodities on every sales room, a method of displaying the commodities, and the like.

Here, according to the present embodiment, in order to know the extent to which the customer is interested in a salesroom that the user such as the store manager pays attention to, specifically in the display shelf for commodities that the user pays attention to, an observation area is set to be in an area where a passage and the like in front of the display shelf for commodities that the user pays attention to is shown, and the activity information relating to an activity situation of a person within the observation area, specifically, the number of stays (the number of staying persons), that is, the number of persons staying within the observation area, and staying time, that is, time for which the person within the observation area stays are acquired. The activity map image that results from visualizing the activity information is generated, and the monitoring moving image that results from superimposing the activity map image onto the moving image of the monitoring area, as illustrated in FIG. 3B, is generated and is displayed. With the activity map image, the extent to which the customer is interested in the salesroom corresponding to the observation area (the display shelf for commodities) can be known.

In an example that is illustrated in FIG. 3A, 3 observation areas A1 to A3 are set to be in a moving image, and as illustrated in FIG. 3B, activity map images H1 to H3 are displayed on positions corresponding to observation areas A1 to A3.

In the activity map image, a numerical value of activity information is expressed by changing the display form (characteristics of the moving image), specifically, by at least one among the display elements that are the size and the color (a hue, intensity, or the like). Particularly, in an example that is illustrated in FIG. 3B, the activity map images H1 to H3 take the shape of an ellipse. The staying time is expressed with the intensity of a filling color of the ellipse, and the number of stays (the number of staying persons) is expressed with sizes of the activity map images H1 to H3. The longer the staying time, the more intense the colors of the activity map images H1 to H3 is. The greater the number of stays, the greater the sizes of the activity map images H1 to H3.

According to the present embodiment, because the activity map image is set to be transmissive, a state where the moving image of the monitoring area is transmissive and seen is attained.

Figure 4:
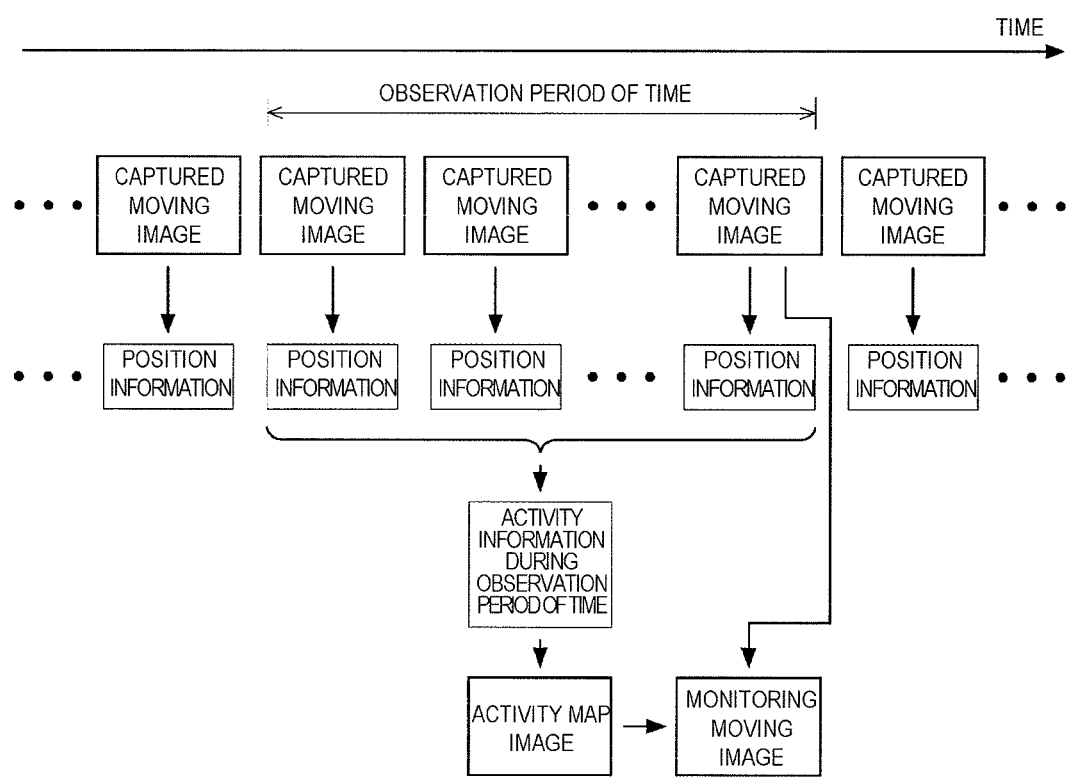
FIG. 4 is an explanatory diagram for describing processing that generates a monitoring moving image.

Next, processing that generates the monitoring moving image that is illustrated in FIG. 3B is described. FIG. 4 is an explanatory diagram for describing the processing that generates the monitoring moving image.

According to the present embodiment, the position information on every person at each point in time is acquired from a moving image (a frame) that is captured at each point in time, temporal statistical processing is performed on the position information on every person at each point in time within a predetermined observation period of time (for example, 30 minutes, one hour, or the like), and thus the pieces of activity information (the staying time and the number of stays) relating to the activity situation of the person are acquired. The activity map image that results from visualizing the activity information is generated, and the monitoring moving image that results from superimposing the activity map image onto the moving image of the monitoring area at a display point in time is generated.

In the monitoring moving image, according to the progress of the display point in time, the moving image of the monitoring area changes from moment to moment. On the other hand, there is a case where the observation period of time changes according to the progress of the display point in time and a case where the observation period of time does not change according to the progress of the display point in time, which will be described in detail below. In the case where the observation period of time changes according to the progress of the display period of time, the activity map image changes from moment to moment along with the moving image of the monitoring area. In the case where the observation period of time does not change from moment to moment according to the progress of the display period of time, the activity map image does not change as well.

When activity information that is a source of the activity map image is generated, the position information may be set to be acquired from captured moving images that are selected at predetermined intervals from among the moving images that are captured during the observation period of time, without the need to acquire the position information from all the moving images that are captured during the observation period of time.

Next, the observation period of time that is to be applied when the activity information that is the source of the activity map image is generated is described. FIGS. 5A, 5B, 6A, and 6B are explanatory diagrams for describing the observation period of time that is to be applied when the activity information that is the source of the activity map image is generated.

According to the present embodiment, the observation period of time is set and thus the activity information is generated based on the position information that is acquired from the moving image that is captured at each point in time within the range of the observation period of time, in such a manner that the activity map image that results from visualizing the activity information is set to be generated. As the observation period of time that is to be applied when the activity information that is the source of the activity map image is generated, there are a period-of-time movement type in which according to the progress of the display point in time of the moving image, the observation period of time moves following the display point in time, a period-of-time expansion type in which the observation period of time gradually expands, and a period-of-time-fixed type in which the observation period of time is fixed.

Figure 5A:
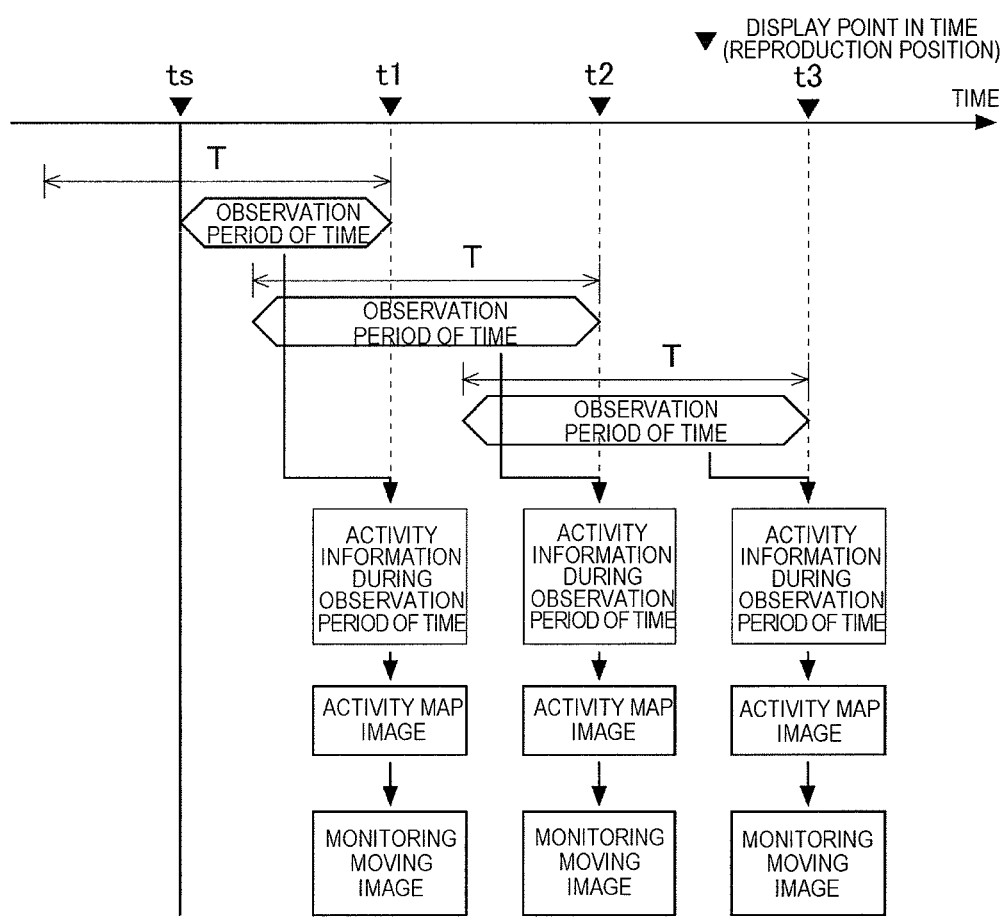
FIG. 5A is an explanatory diagram for describing an observation period of time that is to be applied when activity information that is a source of an activity map image is generated.

FIG. 5A illustrates a case of the period-of-time movement type. In this case, a length T (for example, 30 minutes) of the observation period of time is set according to the user input operation, a period of time from a period of time that is only setting length T earlier than the display point in time to the display point in time is set to be the observation period of time, and the observation period of time moves in such a manner as to follow the display point in time according to the progress of the display point in time of the moving image. In this case, as setting information relating to the observation period of time, the setting length of the observation period of time is set, for example, such as 30 minutes or one hour.

Figure 5B:
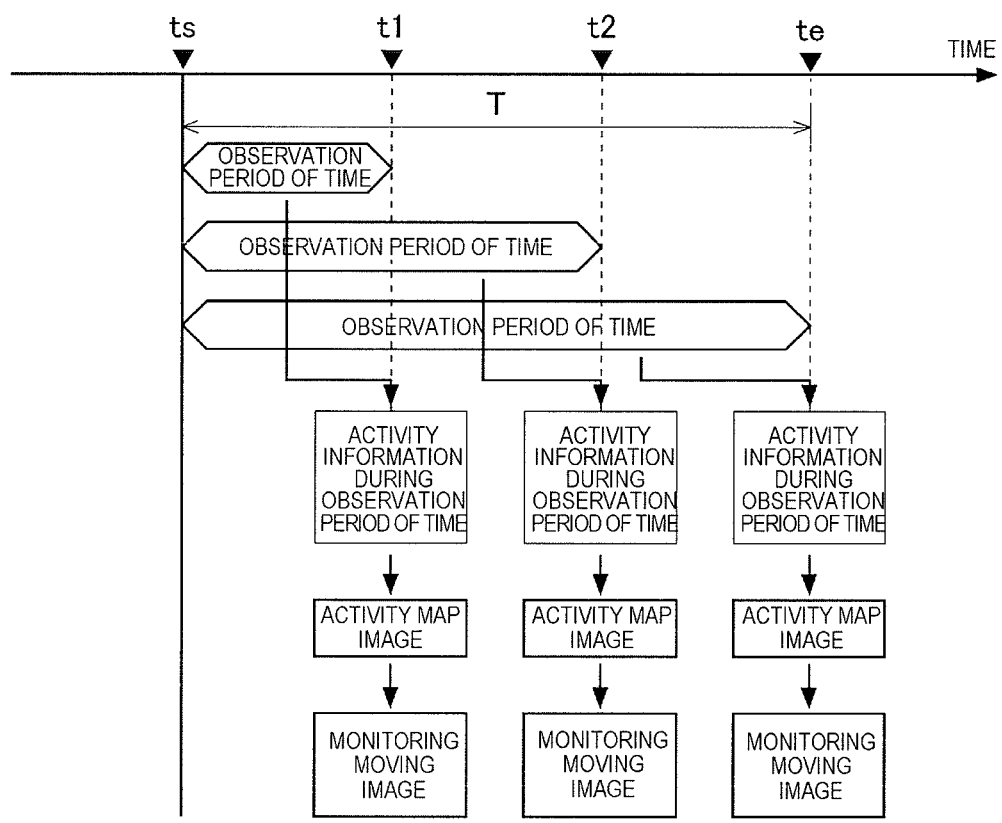
FIG. 5B is an explanatory diagram for describing the observation period of time that is to be applied when the activity information that is the source of the activity map image is generated.

FIG. 5B illustrates a case of the period-of-time expansion type. In this case, the range of the observation period of time (a period of time from a starting point to an ending point) is set according to the user input operation. A starting point of a setting range of the observation period of time is display starting point in time ts, and an ending point of the setting range of the observation period of time is ending point in time te. In this case, as the setting information relating to the observation period of time, a point in time of the starting point of and a point in time of the ending point of the setting range of the observation period of time are set, for example, in such a format as 9:00 to 12:00.

The period-of-time movement type is suitable for a case where the observation period of time is set to be comparatively short and the activity situation is analyzed, and the period-of-time expansion type is suitable for a case where the observation period of time is set to be comparatively long and the activity situation is analyzed. Furthermore, the period-of-time movement type is used in a case where it is desired that the activity situation is known during a period of time immediately before the display point in time, and the period-of-time expansion type is used in a case where, by paying attention to a specific period of time, it is desired that the activity situation is known during such a period of time.

Here, according to the present embodiment, according to the user input operation that arbitrarily designates the display starting point in time (a reproduction starting point in time) of the monitoring moving image, processing that successively outputs the monitoring moving image at each point in time starting from the designated display starting point in time is performed. At this time, in cases of the period-of-time movement type that is illustrated in FIG. 5A and the period-of-time expansion type that is illustrated in FIG. 5B, the observation period of time is limited to a period of time from the display starting point in time to the display point in time.

Specifically, in the case of the period-of-time movement type that is illustrated in FIG. 5A, when an elapsed time from the display starting point in time to the display point in time does not agree with setting length T of the observation period of time, a period of time before the display starting point in time is excluded from the observation period of time and the period of time from the display starting point in time to the display point in time is an actual observation period of time. In an example that is illustrated in FIG. 5A, in a case of display point in time t1, because an elapsed time from display starting point in time ts to display point in time t1 is shorter than setting length T of the observation period of time, a period of time from display starting point in time ts to display point in time t1 is the actual observation period of time.

Therefore, in the period-of-time movement type, in a state where the elapsed time from the display starting point in time to the display point in time does not agree with setting length T of the observation period of time, a range of the actual observation period of time is gradually widened according to the progress of the display point in time, and after the elapsed time from the display starting point in time to the display point in time agrees with setting length T of the observation period of time, the actual observation period of time does not change.

In the case of the period-of-time expansion type that is illustrated in FIG. 5B, the period of time from the display starting point in time to the display point in time is the actual observation period of time, and when the display point in time reaches the ending point of the setting range of the observation period of time, the actual observation period of time is consistent with the setting range of the observation period of time. In an example that is illustrated in FIG. 5B, at display points in time t1 and t2 in the middle of the setting range (a period of time from display starting point in time (a starting point) ts to display ending point in time (an ending point) te) for the observation period of time, a period of time from display starting point in time ts to display point in time t1 and display starting point in time ts to display point t2, respectively, are the actual observation periods of time, and when the display point in time is the ending point of the setting range of the observation period of time, the entire setting range of the observation period of time is the actual observation period of time.

Therefore, in the period-of-time expansion type, in the same manner as with a state where, in the period-of-time movement type, the elapsed time from the display starting point in time to the display point in time agrees with setting length T of the observation period of time, the range of the actual observation period of time is gradually widened according to the progress of the display point in time, and the observation period of time is widened within the setting range of the observation period of time.

Figure 6A:
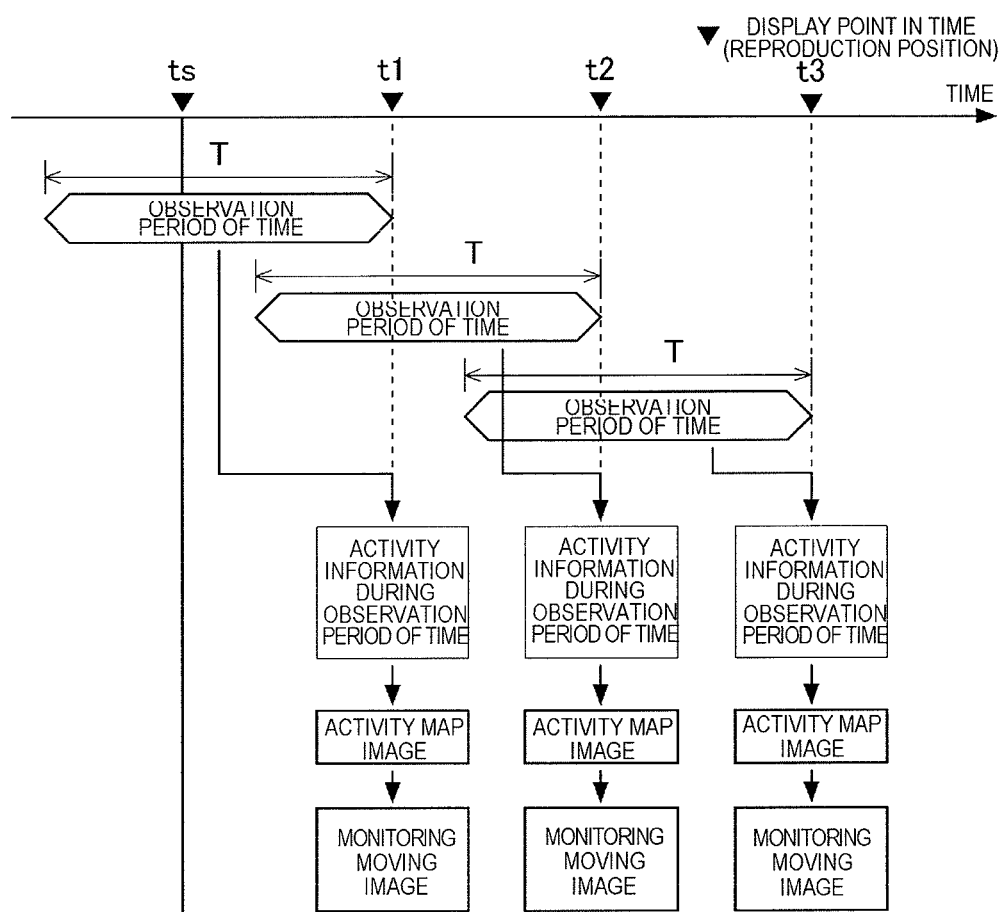
FIG. 6A is an explanatory diagram for describing the observation period of time that is to be applied when the activity information that is the source of the activity map image is generated.

FIG. 6A illustrates a case where a limitation is not imposed on the observation period of time in the period-of-time movement type.

In the example that is illustrated in FIG. 5A, in the period-of-time movement type, the actual observation period of time is set to be limited to the period of time from the display point in time to the display point in time, but in an example that is illustrated in FIG. 6A, the limitation is set not to be imposed on the observation period of time.

Specifically, as illustrated in FIG. 6A, in a case where the limitation is not imposed on the observation period of time in the period-of-time movement type, even if the elapsed time from the display starting point in time to the display point in time does not agree with setting length L of the observation period of time, the period of time that is only the setting length T (for example, 30 minutes) earlier than the display point in time is the actual observation period of time without the period of time before the display starting point in time being excluded from the observation period of time. In the example that is illustrated in FIG. 6A, in the case of display point in time t1, the elapsed time from display starting point in time ts to display point in time t1 does not agree with setting length T of the observation period of time, but a period of time from point in time t1-T that is only setting length T of the observation period of time earlier than display point in time t1 to display point in time t1 is the actual observation period of time.

Figure 6B:
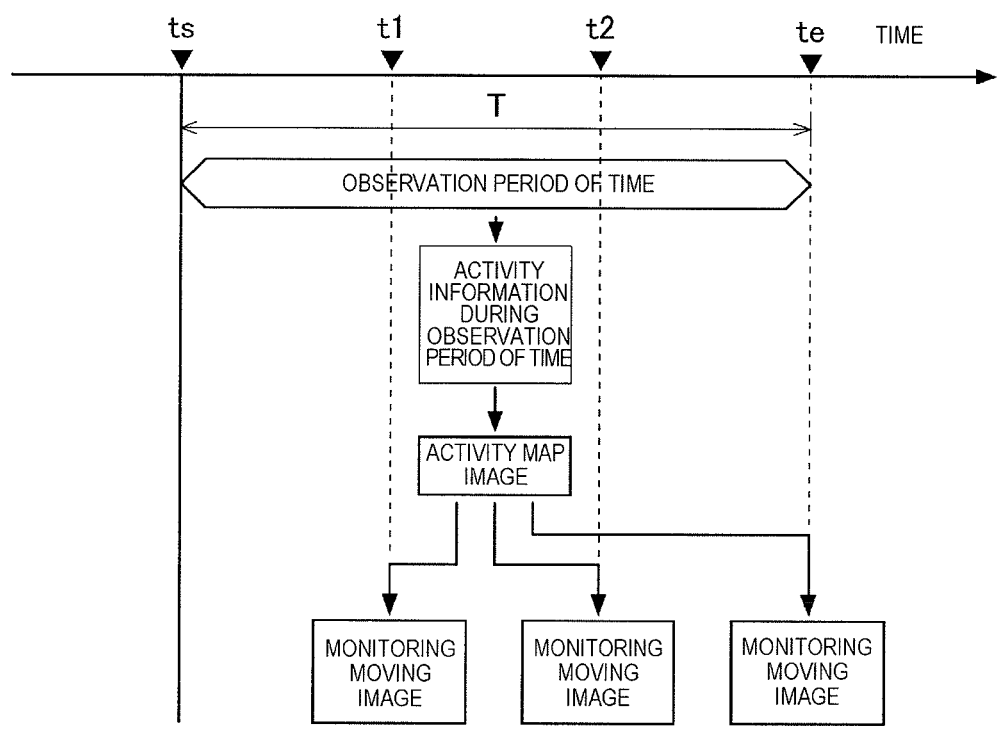
FIG. 6B is an explanatory diagram for describing the observation period of time that is to be applied when the activity information that is the source of the activity map image is generated.

Furthermore, FIG. 6B illustrates a case of the period-of-time-fixed type in which the observation period of time is fixed. In this case, regardless of the display point in time, the setting range (the period of time from display starting point in time (the starting point) ts to display ending point in time (the ending point) te) of the observation period of time is the actual observation period of time, and the activity map image that is displayed at each point in time does not change. The period-of-time-fixed type is the same as the period-of-time expansion type that is illustrated in FIG. 5B, in that the range of the observation period of time is set according to the user input operation, and the period-of-time expansion type can be considered as a type that results from limiting the actual observation period of time to the period of time from the display starting point in time to the display point in time in the period-of-time-fixed type.

Here, because, in methods that are illustrated in FIGS. 5A, 5B, and 6A, a period of time that is later than the display point in time is not included in the observation period of time, these methods can be applied to both a real-time moving image display mode in which a monitoring moving image is generated in real time from a current moving image captured by camera 1 and thus the generated monitoring moving image is displayed, and a stored-moving-image display mode in which a monitoring moving image is generated from past moving images that are stored in recorder 2 and thus the generated monitoring moving image is displayed. In contrast, because, in a method that is illustrated in FIG. 6B, the period of time that is later than the display point in time is included in the observation period of time, this method can be applied only to the stored-moving-image display mode.

Furthermore, in the methods that are illustrated in FIGS. 5A and 5B, information at a point in time earlier than the display starting point in time and information at a point in time later than the display point in time are not included in the activity map image. In contrast, in the method that is illustrated in FIG. 6A the information at a point in time earlier than the display starting point in time is included in the activity map image, and in the method that is illustrated in FIG. 6B, the information at a point in time later than the display point in time is included in the activity map image. For this reason, in methods that are illustrated in FIGS. 6A and 6B, there is a case where information that, judging from a purpose of activity situation analysis, gets in the way of the activity situation analysis is included in the activity map image. In such a case, as illustrated in FIGS. 5A and 5B, a method of imposing the limitation on the observation period of time may be employed. For example, in a case where it is desired that the activity situation is analyzed during a time span such as an afternoon, the displaying of the moving image starts at 13:00, but there is a case where it is not desired that information at a point in time earlier than 13:00 is included in the activity map image. In such a case, as illustrated in FIGS. 5A and 5B, the method of imposing the limitation on the observation period of time may be selected.

According to the present embodiment, as illustrated in FIG. 6B, in the case of the period-of-time-fixed type, one observation period of time is set, but the observation period of time may be set successively, for example, at every time span, in such a manner that the activity map image is generated and displayed. In this case, at a predetermined interval corresponding to the observation period of time, the activity map image is periodically updated.

Figure 7:
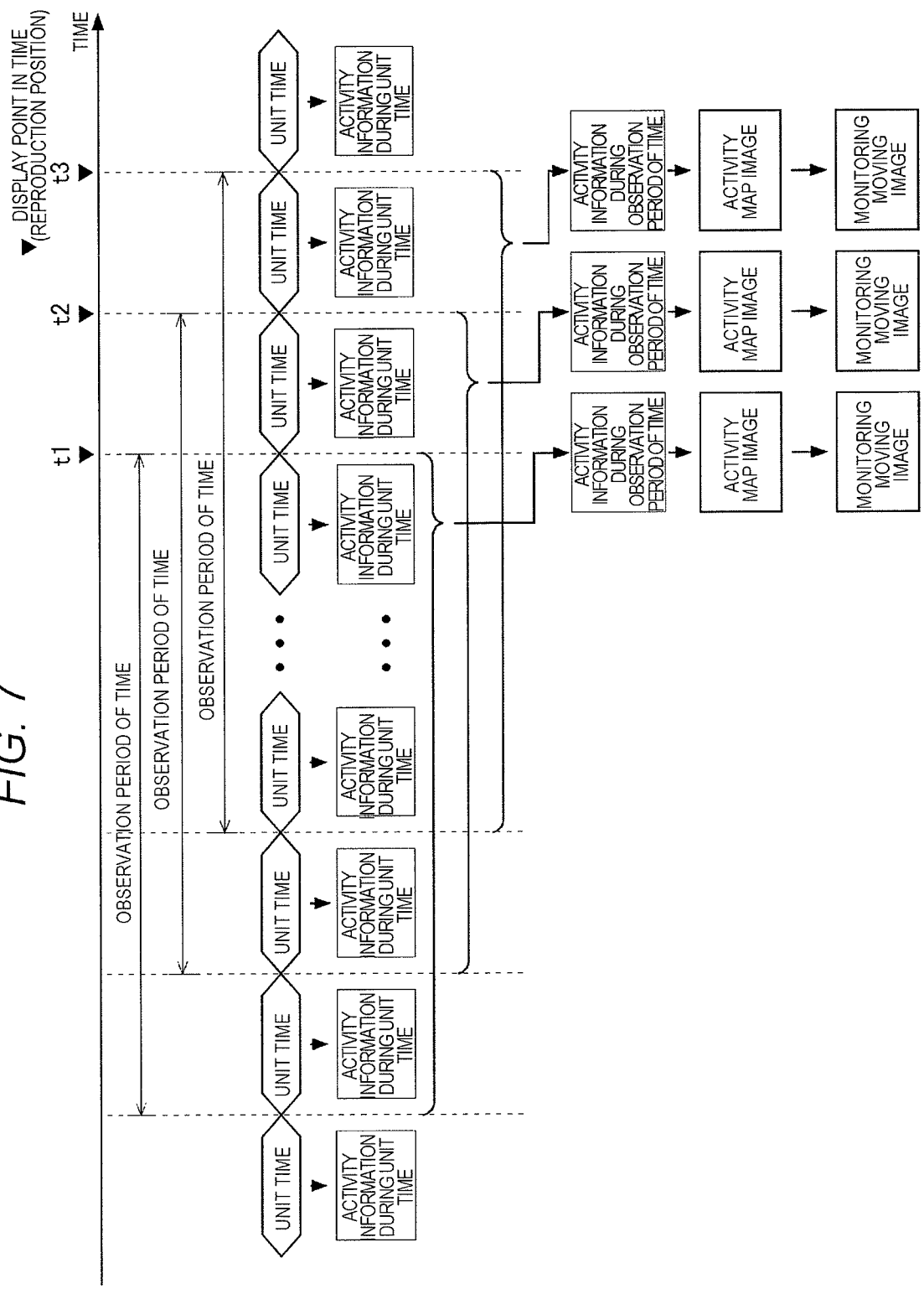
FIG. 7 is an explanatory diagram for describing processing that generates the activity information that is the source of the activity map image.

Next, processing that generates the activity information that is the source of the activity map image is described. FIG. 7 is an explanatory diagram for describing the processing that generates the activity information that is the source of the activity map image. FIG. 7 illustrates an example of the period-of-time movement type that is illustrated in FIGS. 5A and 6A, but the same processing is performed even in cases of the period-of-time expansion type that is illustrated in FIG. 5B and the period-of-time-fixed type that is illustrated in FIG. 6B.

According to the present embodiment, the position information on every person at each point in time is acquired from the moving image (frame) that is captured at each point in time, the temporal statistical processing is performed on the position information on every person at each point in time, and thus the pieces of activity information (the staying time and the number of stays) relating to the activity situation of the person are acquired. However, at this time, first, the activity information during every unit time (for example, 10 seconds, 30 seconds, one minute, or the like) that is set to be sufficiently shorter than the observation period of time (for example, 30 minutes, one hour, or the like), is generated, the activity information during every unit time is aggregated during the observation period of time, and thus the activity information is acquired during the observation period of time.

Here, a method of calculating the number of stays during the observation period of time is described. In this case, the number of motion lines of each person who passes through the observation area during the unit time is counted, and thus, the number of stays (the number of staying persons) during every unit time is obtained. Processing (statistical processing) that simply adds the number of stays during every unit time is performed, and thus the number of stays during the observation period of time can be obtained.

Next, a method of calculating the staying time during the observation period of time is described. In this case, for the motion line of each person that passes through the observation area during the unit hour, the staying time for which every person stays during the staying time (a point in time at which the person enters the observation area from a point in time at which the person leaves the observation area) is acquired, the staying time for which every person stays is next calculated, averaging processing (statistical processing) is then performed on the staying time for which every person stays, and thus the staying time during every unit time is acquired. The averaging processing (the statistical processing) is performed on the staying time during every unit time, and thus the staying time during the observation period of time can be obtained.

Furthermore, as illustrated in FIG. 5A, in the case of the period-of-time movement type, the observation period of time moves in such a manner as to follow the display point in time according to the progress of the display point in time of the moving image. However, as illustrated in FIG. 7, in a method of acquiring the activity information during every unit time, a state where the observation period of time is shifted by the unit time each time the display point in time progresses by the unit time is attained, and according to this, the activity information during the observation period of time is updated. At this time, processing is only performed that excludes and integrates the activation information during the unit time that is a difference between a current observation period of time and a previous observation period of time, from and into the activity information during the previous observation period of time, and thus the activity information during the current observation period of time can be acquired. That is, during the unit time within the previous observation period of time, if the activity information during a unit time other than the current observation period of time is excluded from the activity information during the previous observation period of time, and at the same time the activity information during the unit time that is newly added to the current observation period of time is integrated into the activity information during the previous observation period of time, the activity information during the current observation period of time can be acquired.

Furthermore, in a state where the elapsed time from the display starting point in time to the display point in time does not agree with setting length T of the observation period of time, because only the ending point of the observation period of time moves according to the progress of the display point in time, if the activity information during the unit time that is newly added to the current observation period of time is integrated into the activity information during the previous observation period of time, the activity information during the current observation period of time can be acquired.

If the display point in time progresses within a unit time, there is no change during the observation period of time, and when the display point in time reaches the ending point of the unit time, processing that updates the activity information during the observation period of time is performed. For this reason, if the display point in time progresses within the range of the unit time, there is no change in the activity map image, and when the display point in time proceeds to the next unit time, the activity map image is updated. That is, each time when the display point in time progresses by the unit time, the activity map image is updated.

On the other hand, as illustrated in FIG. 5B, in the case of the period-of-time expansion type, because only the ending point of the observation period of time moves according to the progress of the display point in time, if the activity information during the unit time that is newly added to the current observation period of time is integrated into the activity information during the observation period of time, which is acquired last time, the activity information during the current observation period of time can be acquired.

Figure 8:
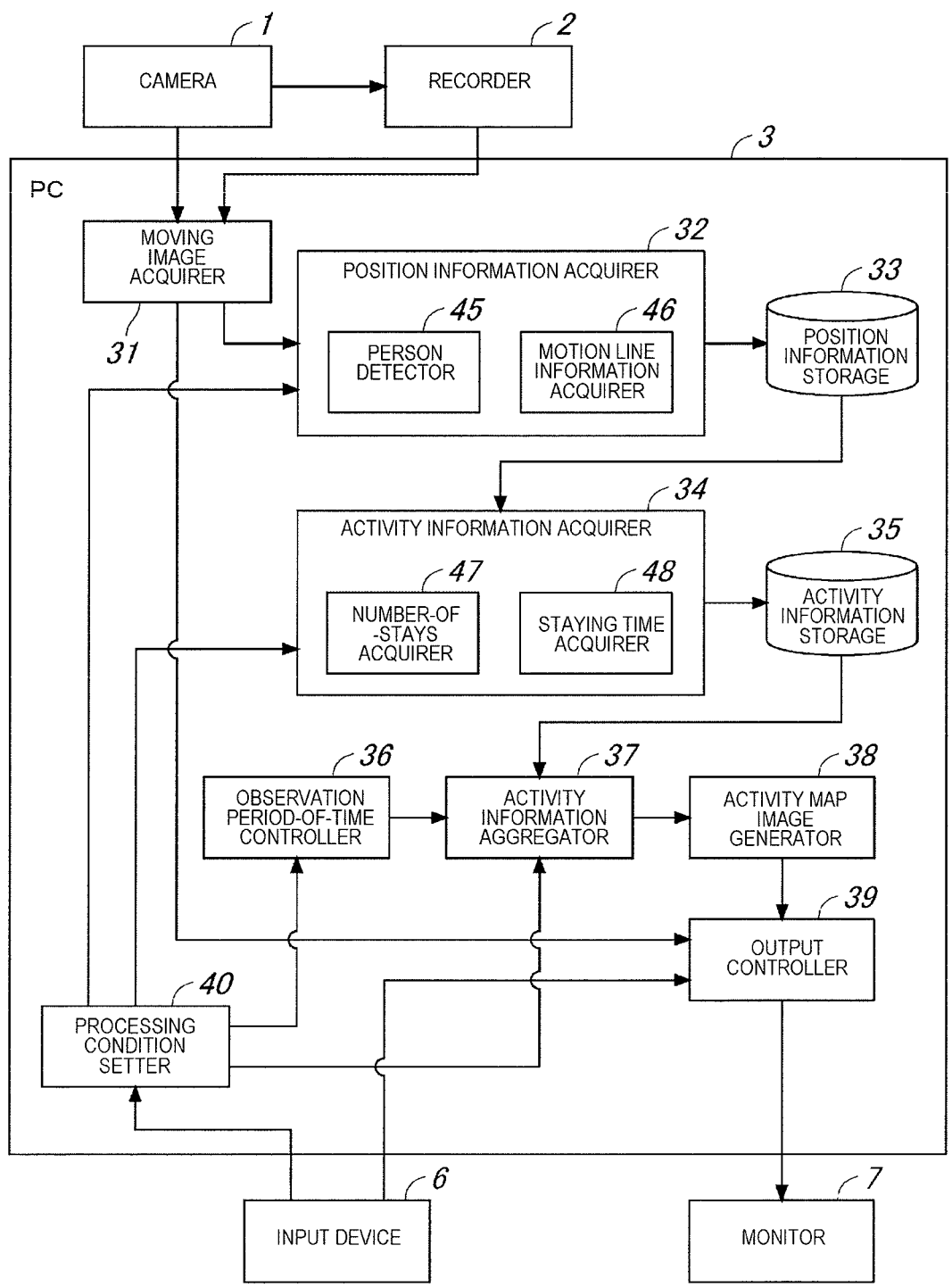
FIG. 8 is a functional block diagram illustrating a schematic configuration of the PC.

Next, processing that is performed on PC 3 that is illustrated in FIG. 1 is described. FIG. 8 is a functional block diagram illustrating a schematic configuration of PC 3.

PC 3 includes moving image acquirer 31, position information acquirer 32, position information storage 33, activity information acquirer 34, activity information storage 35, observation-period-of-time controller 36, activity information aggregator 37, activity map image generator 38, output controller 39, processing condition setter (an observation condition setter and a unit time setter) 40.

In moving image acquirer 31, a moving image of the inside of the store, which is captured by camera 1 is acquired from camera 1 or recorder 2. Here, in a case where a current moving image is displayed in real time, a moving image is acquired from camera 1, and in a case where a past moving image is displayed, a moving image is acquired from recorder 2.

Position information acquirer 32 detects a person from the moving image that is acquired in moving image acquirer 31 and acquires the position information on every person, and includes person detector 45 and motion line information acquirer 46.

In person detector 45, processing that detects a person from the moving image (a frame) acquired in moving image acquirer 31 is performed. The processing that is performed in person detector 45 may use a known image recognition technology. In motion line information acquirer 46, based on a result of the detection in person detector 45, processing that acquires a motion line of every person is performed. The pieces of information relating to the motion line of every person, which are acquired in motion line information acquirer 46, are stored in position information storage 33 as position information on every person.

In position information acquirer 32, coordinates of a person's central point are acquired, and the motion line is generated in such a manner that the person's central points are connected. Furthermore, time information relating to a point in time at which every person is detected and the like, which are acquired starting from a point in time at which a moving image from which a person is detected is captured is included in the position information that is acquired in position information acquirer 32.

Activity information acquirer 34 performs the temporal statistical processing on position information (motion line information) of a person that is acquired by position information acquirer 32 and is stored in position information storage 33, and acquires the pieces of activity information (the staying time and the number of stays) relating to the activity situation of the person in each observation area (refer to FIG. 3A) per unit time. Activity information acquirer 34 includes number-of-stays acquirer 47 and staying time acquirer 48. The activity information during every unit time, which is acquired in activity information acquirer 34 is stored in activity information storage 35.

In number-of-stays acquirer 47, based on motion line information on every person that is stored in position information storage 33, processing that acquires the number of stays (the number of staying persons) during every unit time is performed. In this processing, the number of motion lines of each person who passes through the observation area during the unit time is counted, and thus, the number of stays during every unit time is obtained. This processing is performed on every observation area.

In staying time acquirer 48, based on the motion line information on every person that is stored in position information storage 33, the processing that acquires the staying time during every unit time is performed. In this processing, first, for the motion line of each person that passes through the observation area during the unit hour, the staying time for which every person stays during the staying time (a point in time at which the person enters the observation area from a point in time at which the person leaves the observation area) is acquired, the staying time for which every person stays is next acquired, averaging processing (statistical processing) is then performed on the staying time for which every person stays, and thus the staying time during every unit time is acquired. This processing is performed for every observation area.

In activity information aggregator 37, processing is performed that, during the observation period of time, aggregates the pieces of activity information (the staying time and the number of stays) during the unit time that is acquired in activity information acquirer 34, and that acquires the activity information during the observation period of time. In this processing, the processing (the statistical processing) that simply adds the number of stays during every unit time is performed and the activity information during the observation period of time is obtained. Furthermore, the averaging processing (the statistical processing) is performed on the staying time during the unit time and the staying time during the observation period of time is acquired. These processing operations are performed for every observation area.

In observation-period-of-time controller 36, control of the observation period of time is performed in accordance with conditions of the observation period of time that are set in processing condition setter 40. According to the present embodiment, as the conditions relating to the observation period of time, an observation period-of-time type (the period-of-time movement type, the period-of-time expansion type, or the period-of-time-fixed type), the presence or absence of the limitation of the observation period-of-time during the period-of-time movement type, and the length and the range of the observation period of time are set in processing condition setter 40, and, based on the conditions of the observation period of time, and the display starting point in time of and the current display point in time of the monitoring moving image, the control of the observation period of time is performed in observation-period-of-time controller 36. Based on the observation period of time that is controlled by observation-period-of-time controller 36, activity information aggregation processing is performed in activity information aggregator 37.

In activity map image generator 38, processing is performed that generates the activity map image which results from visualizing the pieces of activity information (the number of stays and the staying time) during the observation period of time, which is acquired in activity information aggregator 37. If a display form (a color or transmissivity) of the activity map image is set in advance, this may be sufficient, but the display form may be set to be able to be suitably selected by the user.

In the output controller 39, processing is performed that generates the monitoring image which results from superimposing the activity map image that is generated in activity map image generator 38, onto the moving image of the monitoring area that is acquired in moving image acquirer 31, at every predetermined point in time. Accordingly, the monitoring screen (refer to FIG. 9) is displayed on monitor 7. Furthermore, in output controller 39, processing is performed that displays a processing condition setting screen (refer to FIG. 14) on monitor 7.

Furthermore, in output controller 39, processing is performed that controls an output of the monitoring moving image according to the user input operation. Particularly, in output controller 39, processing is performed that, according to the user's input operation that arbitrarily designates the display starting point in time of the monitoring moving image, generates the monitoring moving image from the designated display starting point in time and outputs the generated monitoring moving image.

In processing condition setter 40, according to the user's input operation, processing is performed that sets various conditions that are to be met when generating the activity map image. According to the present embodiment, processing that sets a position of the observation area is performed according to the user's input operation. Here, in setting the position of the observation area, if an input screen on which the image of the inside of the store is displayed is displayed on monitor 7, a position of the target area is input by the user through the input screen, and thus position information on the target area is acquired, this may be sufficient. In accordance with the position information on the target area that is set in processing condition setter 40, processing that acquires the position information on every person is performed in position information acquirer 32.

Furthermore, in processing condition setter 40, according to the user input operation, processing is performed that sets the observation period-of-time type (the period-of-time movement type, the period-of-time expansion type, or the period-of-time-fixed type), the presence or absence of the limitation of the observation period-of-time during the period-of-time movement type, and the length and the range of the observation period of time, as the conditions relating to the observation period of time. Furthermore, in processing condition setter 40, according to the user input operation, processing that sets the unit time is performed.

In setting the condition relating to the observation period of time and the unit time, the processing condition setting screen (refer to FIG. 14) may be displayed on monitor 7 and an input operation designating the condition relating to the observation period of time and the unit time may be performed by the user on the processing condition setting screen, in such a manner that information on the condition relating to the observation period of time and on the unit time is acquired. In accordance with the conditions relating to the observation period of time and the unit time that are set in processing condition setter 40, predetermined processing operations are performed in activity information acquirer 34, observation-period-of-time controller 36, and activity information aggregator 37.

Furthermore, according to the present embodiment, input relating to one or more processing conditions is performed on the monitoring screen (refer to FIG. 9) on which the monitoring moving image is displayed, and the monitoring screen serves as the processing condition setting screen too. Particularly, the processing conditions that are desired to be set in advance are designated by the user on the processing condition setting screen (refer to FIG. 14), and the processing conditions that can be set whenever necessary when the monitoring moving image is browsed through are designed by the user on the monitoring screen.

PC 3 that is illustrated in FIG. 8 has a processor (a CPU) and a program memory. Each unit of PC 3 is realized by executing an application program (instructions) for the activity situation analysis in the CPU of PC 3. This program may be not only configured as a dedicated device that is introduced in advance in PC 3 as the information processing apparatus, but may be also set to be provided to the user in a state of being recorded on a suitable program recording medium, as an application program running on a general-purpose OS, or through a network.

Figure 10A:
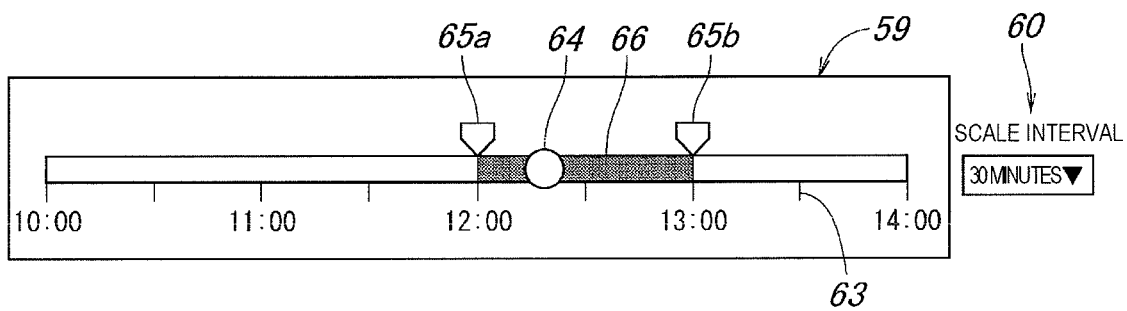
FIG. 10A is an explanatory diagram illustrating a display point-in-time and observation period-of-time designation section that is illustrated in FIG. 9.
Figure 10B:
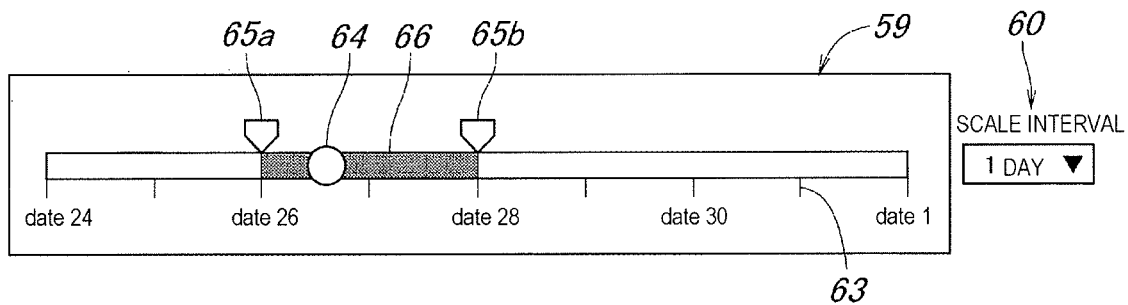
FIG. 10B are explanatory diagrams illustrating the display point-in-time and observation period-of-time designation section that is illustrated in FIG. 9.

Next, the monitoring screen that is displayed on monitor 7 which is illustrated in FIG. 8 is described. FIG. 9 is an explanatory diagram illustrating the monitoring screen that is displayed on monitor 7. FIGS. 10A and 10B are explanatory diagrams illustrating display point-in-time and observation period-of-time designation section 59 that is illustrated in FIG. 9.

The user browses through this monitoring screen in order to know the activity situation of the customers within the store. Included in the monitoring screen are store selection section 51, starting button 52, setting button 53, operation mode selection section 54, date and time designation section 55, moving image operation section 56, moving image display mode selection section 57, observation period-of-time type selection section 58, display point-in-time and observation period-of-time designation section 59, scale regulator 60, and moving image display section 61.

In store selection section 51, the user selects a store that is a monitoring target, from among multiple stores. Here, the store is set to be selected with a pull-down menu. With starting button 52, activity situation analysis processing is started on PC 3. With setting button 53, various conditions in the activity situation analysis processing are set. According to the present embodiment, when setting button 53 is operated, processing condition setting screen (refer to FIG. 14) is displayed in a pop-up manner. In operation mode selection section 54, an operation mode is selected. Operation modes, such as salesroom monitoring, commodity monitoring, display alert, and stockout alert, are prepared. The monitoring screen that is illustrated in FIG. 9 is displayed by selecting the salesroom monitoring.

The monitoring moving image generated in the output controller 39, that is, the monitoring image (refer to FIG. 3B) that results from superimposing the activity map image onto the moving image of the monitoring area is displayed in a motion video format on moving image display section 61. Particularly, in an example that is illustrated in FIG. 9, two images that result from panoramically expanding a moving image which is captured by camera 1 that is an omnidirectional camera are displayed. The entire store is shown in the two images, and a situation of the entire store can be checked.

In date and time designation section 55, the user designates a date and time (year, month, date, hour, minute and the like). Here, the date and time is set to be directly input, but a calendar screen may be displayed in such a manner that the date and time may be set to be able to designated. When the date and time is input with date and time designation section 55, the monitoring moving image of the data and time that is input is displayed on moving image display section 61. When a real-time moving image display mode is selected in moving image display mode selection section 57, a current date and time is displayed.

In moving image display mode selection section 57, the user selects the moving image display mode (the real-time moving image display mode or the stored-moving-image display mode). Here, when the real-time moving image display mode is selected, the monitoring moving image on which a current situation is displayed in real time is displayed on moving image display section 61, and when the stored-moving-image display mode is selected, the monitoring moving image on which a situation at a date and time that is designated in date and time designation section 55 is displayed is displayed on moving image display section 61.

In observation period-of-time type selection section 58, the user selects the observation period-of-time type (the period-of-time movement type, the period-of-time expansion type, or the period-of-time-fixed type). Here, when the period-of-time movement type is selected, based on the length of the observation period of time that is designated in display point-in-time and observation period-of-time designation section 59, as illustrated in FIGS. 5A and 6A, control is performed that gradually moves the observation period of time according to the progress of the display point in time. When the period-of-time expansion type is selected, based on the range of the observation period of time that is designated in display point-in-time and observation period-of-time designation section 59, as illustrated on FIG. 5B, control is performed that gradually widens an actual observation period of time according to the progress of the display point in time within the setting range of the observation period of time. When the period-of-time-fixed type is selected, as illustrated in FIG. 6B, control is performed that fixes the observation period of time.

In display point-in-time and observation period-of-time designation section 59, the user designates the display point in time of the moving image of the monitoring area, and the length or the range of the observation period of time, which are displayed on moving image display section 61. Displayed on display point-in-time and observation period-of-time designation section 59 are scale 63 indicating a time axis, slider (a display point-in-time operation section) 64 indicating the display point in time of the moving image, slider (an observation period-of-time operation section) 65a indicating a starting point of the observation period of time, and observation period-of-time display section 66 indicating the range of the observation period-of-time that is designated by sliders 64 and 65a.

Slider 64 indicates a current point in time in the real-time moving image display mode, and indicates a reproduction point in time in the stored-moving-image display mode. Furthermore, in the stored-moving-image display mode, an operation (a click or a drag) that moves slider 64 along scale 63 using input device 6 such as a mouse can be performed. Slider 64 is operated, and thus the monitoring moving image at a desired point in time can be displayed on moving image display section 61.

Furthermore, FIG. 9 illustrates the case of the period-of-time movement type, and slide 65a indicates the starting point of the observation period of time. FIGS. 10A and 10B illustrate the cases of the period-of-time expansion type and the period-of-time-fixed type, respectively. Sliders (the observation period-of-time operation sections) 65a and 65b indicate the starting point and the ending point of the observation period of time, respectively. In the case of the period-of-time movement type that is illustrated in FIG. 9, because the display point in time of the moving image of the monitoring area and the ending point of the observation period of time are consistent with each other, slider 65b does not indicate the ending point of the observation period of time.

In the stored-moving-image display mode, as is the case with slider 64, an operation (a click or a drag) that moves sliders 65a and 65b along scale 63 can be performed using input device 6. In the case of the period-of-time movement type that is illustrated in FIG. 9, slider 65a is operated, and thus the length of the observation period of time can be designated. In the cases of the period-of-time expansion type and the period-of-time-fixed type that are illustrated in FIGS. 10A and 10B, respectively, sliders 65a and 65b are operated, and thus the range of the observation period of time can be designated.

In scale regulator 60, the user designates a scale interval of scale 63 of display point-in-time and observation period-of-time designation section 59. Here, the scale interval (for example, fifteen minutes, thirty minutes, one hour, one day, or the like) is set to be selected with the pull-down menu. In examples that are illustrated in FIGS. 9 and 10A, the scale-mark interval is set to thirty minutes, and in an example that is illustrated in FIG. 10B, the scale interval is set to be one day. Furthermore, in the display point-in-time and observation period-of-time designation section 59, a display range of scale 63 is changed according to the scale interval that is designated in scale regulator 60. In the examples that are illustrated in FIGS. 9 and 10A, a period of time from 10:00 to 14:00 is displayed, and in the example that is illustrated in FIG. 10B, a period of time from a date of 24 to a date of 1 of the next month is displayed.

When the scale interval that is designated in scale regulator 60 may be set to be a minimum unit that is used when the display point in time or the observation period of time is designated. That is, the display point in time or the observation period of time may be set to be able to be adjusted with the scale interval. For example, when the scale interval is set to be 30 minutes, the display point in time or the observation period of time can be adjusted at intervals of 30 minutes. Furthermore, the unit time may be set to be displayed on scale 63 of display point-in-time and observation period-of-time designation section 59. In this case, the scale interval that is designated in scale regulator 60 may be displayed as a large scale, and the unit time may be displayed as a small scale.

In moving image operation section 56, an operation relating to reproduction of the monitoring moving image that is displayed on moving image display section 61 is performed. Operation buttons for normal reproduction, fast forwarding, rewinding, and stop are provided in moving image operation unit 56. The monitoring moving image can be efficiently browsed through over a long period of time by operating these operation buttons. Particularly, in the stored-moving-image display mode, slider 64 of display point-in-time and observation period-of-time designation section 59 is operated to designate a reproduction starting position, moving image operation section 56 is operated, and thus the monitoring moving image can be browsed through starting from a desired point in time.

Figure 11:
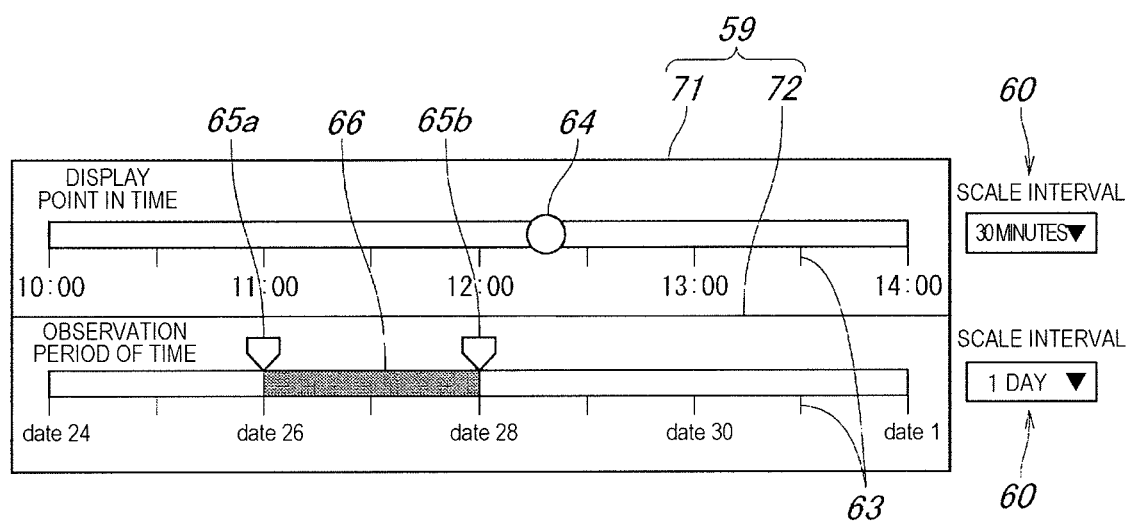
FIG. 11 is an explanatory diagram for describing a different example of the display point-in-time and observation period-of-time designation section.

Next, a different example of display point-in-time and observation period-of-time designation section 59 that is illustrated in FIG. 9 is described. FIG. 11 is an explanatory diagram for describing the different example of display point-in-time and observation period-of-time designation section 59.

In the example that is illustrated in FIG. 9, display point-in-time and observation period-of-time designation section 59 is provided in the monitoring screen, and designation of the display point in time and the observation period of time is performed in scale 63, but in an example that is illustrated in FIG. 11, display point-in-time and observation period-of-time designation section 59 is set to be provided in a state of being divided into display point-in-time designation section 71 and observation period-of-time designation section 72 in such a manner that the designation of the display point in time and the observation period of time can be performed with different scales 63.

In display point-in-time designation section 71, the user designate the display point in time. With observation period-of-time designation section 72, the user designates the observation period of time. Two scale regulators 60 are correspondingly provided in display point-in-time designation section 71 and observation period-of-time designation section 72, respectively. The scale intervals can be designated for display point-in-time designation section 71 and observation period-of-time designation section 72, respectively. In an example that is illustrated in FIG. 11, in display point-in-time designation section 71, the scale interval is set to be 30 minutes, and in observation period-of-time designation section 72, the scale interval is set to be one day.

Accordingly, the designation of the display point in time and the observation period of time can easily be performed. That is, in a case where the observation period of time is designated with its unit as one day, the observation period of time may be designated with the scale interval of scale 63 as one day, but in this scale 63, the display point in time (the reproduction point in time) is difficult to designate. Conversely, when the scale interval of scale 63 is set to be 30 minutes in such a manner that the display point in time is easy to designate, the observation period of time is difficult to designate with its unit as one day. In this case, when the designation of the display point in time and the observation period of time is set to be able to be performed with different scales 63, the display point in time and the observation period of time are easy to designate.

Figure 12A:
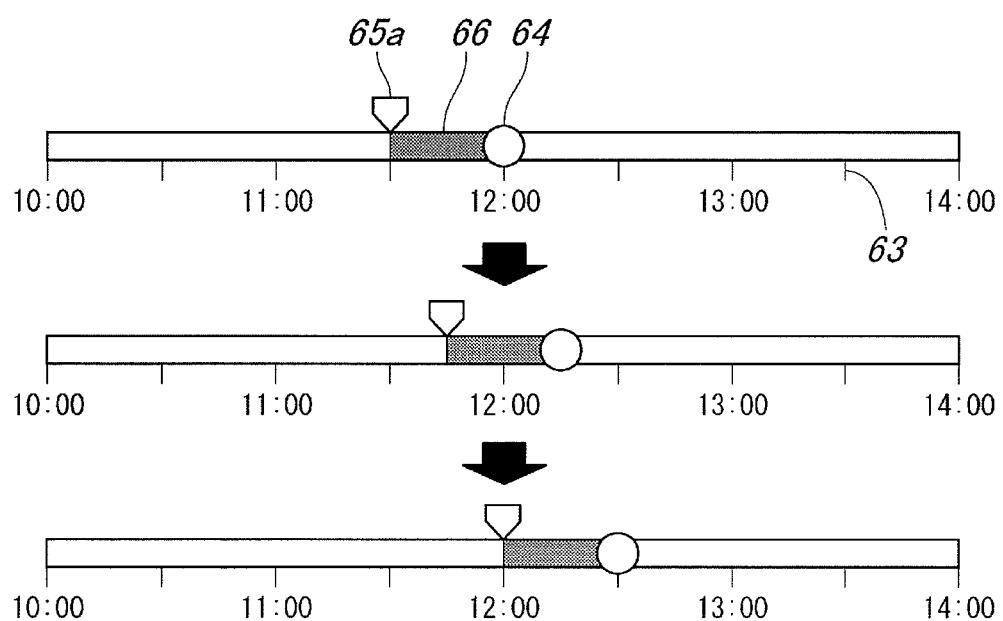
FIG. 12A is an explanatory diagram illustrating a transition situation of the display point-in-time and observation period-of-time designation section.
Figure 12B:
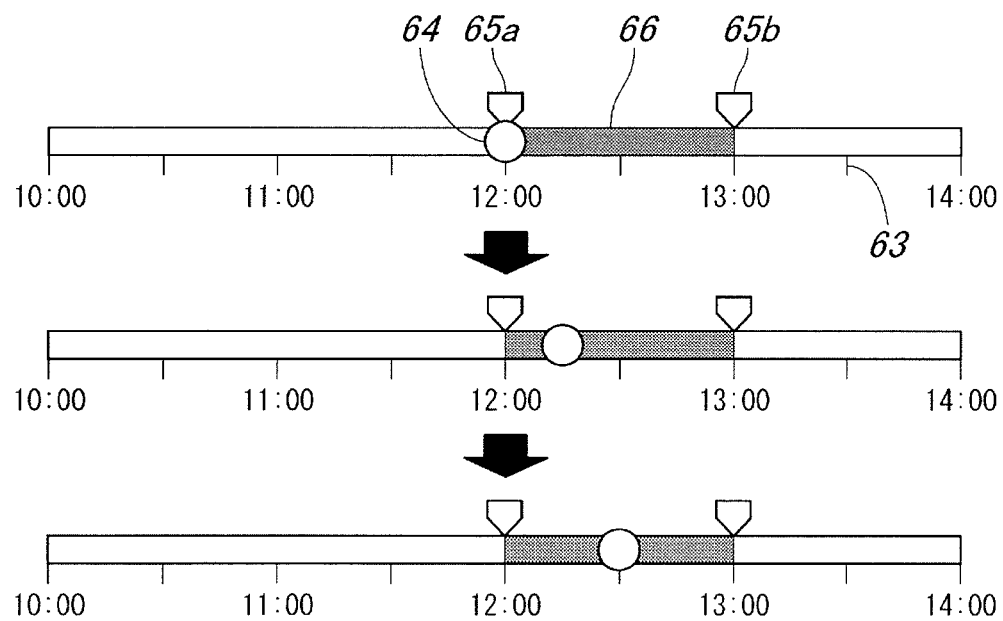
FIG. 12B is an explanatory diagram illustrating the transition situation of the display point-in-time and observation period-of-time designation section.

Next, a transition situation of display point-in-time and observation period-of-time designation section 59 that is illustrated in FIG. 9 is described. FIGS. 12A and 12B are explanatory diagrams illustrating the transition situation of display point-in-time and observation period-of-time designation section 59.

FIG. 12A illustrates a case of the period-of-time movement type. In this case, according to the progress of the display point in time, slider 64 indicating the display point in time moves. At the same time, slider 65a indicating starting point of the observation period of time and observation period-of-time display section 66 indicating the range of the observation period of time are integrated into one piece and moves following slider 64 indicating the display point in time.

FIG. 12B illustrates the cases of the period-of-time expansion type and the period-of-time-fixed type. In these cases, slider 64 indicating the display point in time moves according to the progress of the display point in time, but sliders 65a and 65b indicating the starting point and the ending point of the observation period of time, respectively, and observation period-of-time display section 66 indicating the range of the observation period of time remain motionless.

Next, different examples of the display point in time and the observation period of time are described.

Figure 13A:
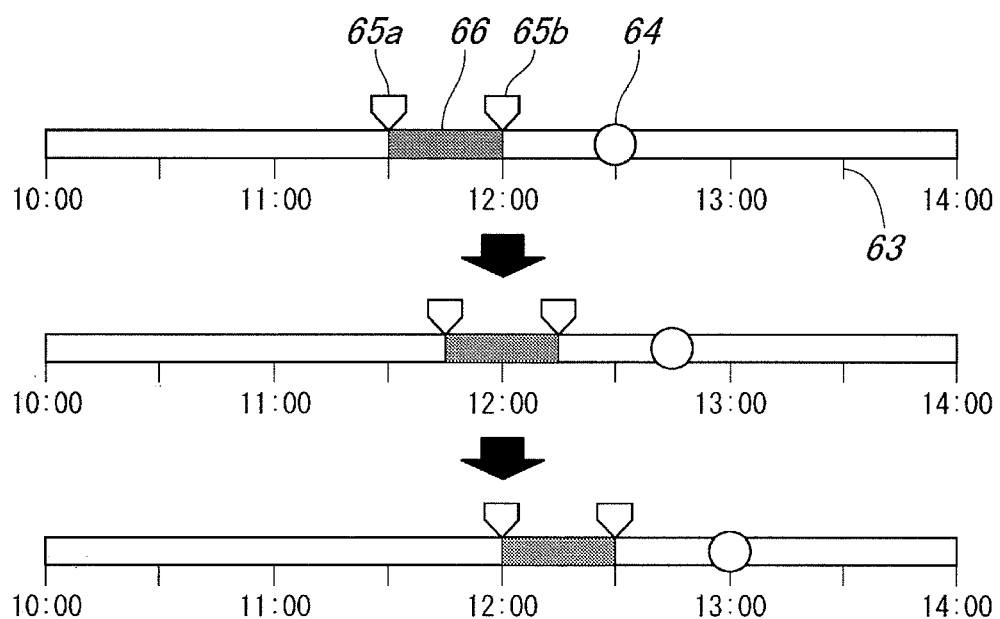
FIG. 13A is an explanatory diagram illustrating the transition situation of the display point-in-time and observation period-of-time designation section in different examples of a display point in time and the observation period of time.
Figure 13B:
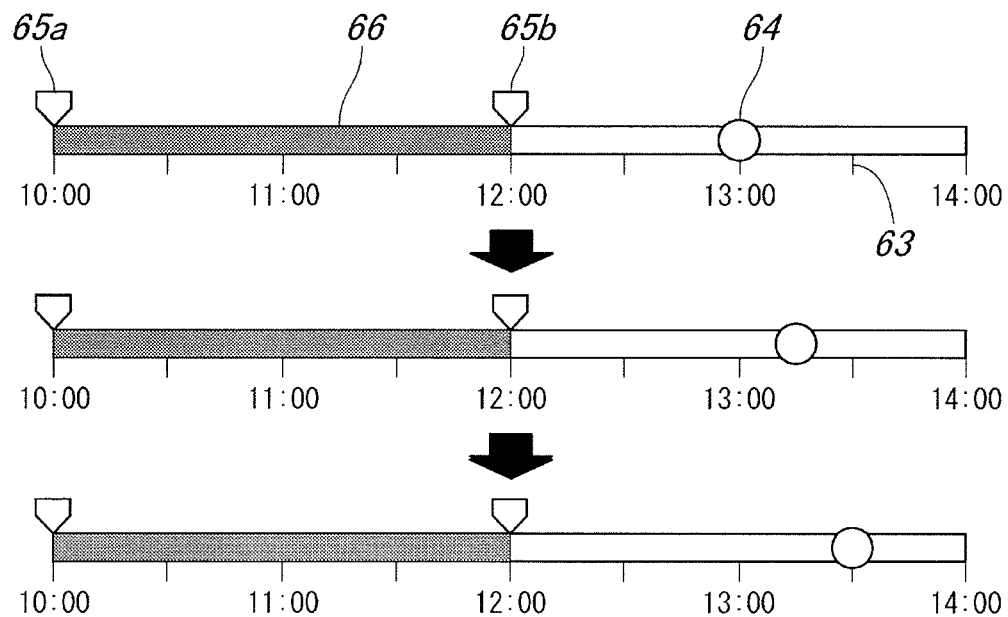
FIG. 13B is an explanatory diagram illustrating the transition situation of the display point-in-time and observation period-of-time designation section in the different examples of the display point in time and the observation period of time.

FIGS. 13A and 13B are explanatory diagrams illustrating the transition situation of display point-in-time and observation period-of-time designation section 59 in the different examples of the display point in time and the observation period of time.

In the example of the period-of-time movement type that is illustrated in FIG. 12A, the period of time that is only the setting length of the observation period of time earlier than the display point in time is set to be the observation period of time, and the display point in time is the ending point of the observation period of time. However, as illustrated in FIG. 13A, the display point in time and the observation period of time may be in a state of being at a distance from each other, that is, the period of time that is only the setting length earlier than the point in time that is a predetermined time earlier than the display point in time may be the observation period of time, in such a manner that, according to the progress of the display point in time, the observation period of time moves at a predetermined distance from the display point in time. In this case, in a state of being at a distance from slider 64 indicating the display point in time of the moving image, sliders 65a and 65b indicating the observation period of time and the observation period-of-time display section 66 move in such a manner as to follow the display point in time.

Furthermore, in the examples of the period-of-time expansion type and the period-of-time-fixed type that are illustrated in FIG. 12B, the display point in time is within the range of the observation period of time, but as illustrated in FIG. 13B, the display starting point in time may be designated out of the range of the observation period of time, that is, the display of the moving image may be started from a position that is at a distance from the observation period of time. In this case, slider 64 indicating display point in time starts to move from the position that is at a distance from the observation period of time, sliders 65a and 65b indicating the starting point and the ending point of the observation period of time, respectively, and observation period-of-time display section 66 remain motionless.

Particularly, in a method that is illustrated in FIG. 13B, for example, a usage method is possible in which an afternoon moving image is viewed while a morning activity map image is displayed, that is, the observation period of time is designated as a morning time span (from 10:00 to 12:00) and the display starting point in time of the moving image is designated as an afternoon point in time (13:00). Furthermore, there is a usage method in which a today moving image is viewed while a yesterday activity map image at the same time span is displayed.

In the case of the period-of-time movement type, it is possible to designate the display point in time in such a manner that the display point in time is positioned at a predetermined position within the observation period of time. In this case, according to the progress of the display point in time, the observation period of time moves with the display point in time in a state of covering before and after the display point in time.

Figure 14:
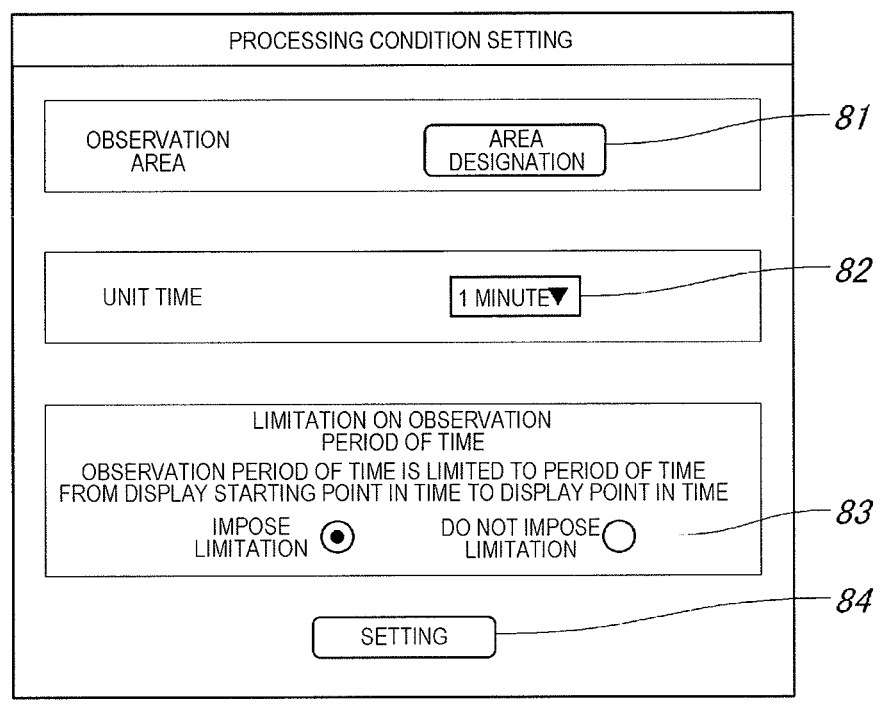
FIG. 14 is an explanatory diagram illustrating a processing condition setting screen that is displayed on the monitor.

Next, processing that is performed in processing condition setter 40 which is illustrated in FIG. 8 is described. FIG. 14 is an explanatory diagram illustrating the processing condition setting screen that is displayed on monitor 7.

According to the present embodiment, in processing condition setter 40, according to the user input operation, the processing is performed that sets various conditions that are to be met when generating the activity map image. At this time, the processing condition setting screen that is illustrated in FIG. 14 is displayed on monitor 7. In the processing condition setting screen, the user designates various conditions that are to be met when generating the activity map image, and the processing condition setting screen is displayed in a pop-up manner according to the operating of setting button 53 on the monitoring moving image (refer to FIG. 9).

Included in the processing condition setting screen are area setting button 81, unit time designation section 82, observation period-of-time limitation designation section 83, and setting button 84.

When area setting button 81 is operated, the input screen on which the moving image of the inside of the store is displayed is displayed, and the user performs an operation of inputting a position of the observation area into the input screen using input device 6 such as a mouse. Without being into a different screen, the observation area may be set to be able to be input into the processing condition setting screen.

In unit time designation section 82, the user designates a length of the unit time. Here, the length (for example, 10 seconds, 30 seconds, one minute, or the like) of the unit time may be selected from the pull-down menu. Based on the unit time that is designated in unit time designation section 82, as illustrated in FIG. 7, processing is performed that generates the activity information during every unit time.

The unit time is a minimum unit of the observation period of time, and the observation period of time can be adjusted to a length of the unit time. For this reason, the unit time is changed, and thus the extent to which the observation period of time is adjusted can be changed. For example, in a case where the extent to which the observation period of time is adjusted is desired to be small, the unit time may be shortened. Furthermore, normally, because the changing of the unit time is infrequently performed, the unit time may be set to be a predetermined time (for example, 30 seconds), and processing condition setting may be omitted.

In observation period-of-time limitation designation section 83, the user designates the presence or absence of limitation of the observation period of time, that is, whether or not the observation period of time is limited to the period of time from the display starting point in time to the display point in time. Here, when "limiting" is selected, as illustrated in FIGS. 5A and 5B, processing is performed that limits the observation period of time. When "do not limit" is selected, as illustrated in FIGS. 6A and 6B, processing is performed that does not limit the observation period of time.

As described above, the user performs necessary operations in area setting button 81, unit time designation section 82, and observation period-of-time limitation designation section 83, and when setting button 84 is operated, in processing condition setter 40, processing operations are performed that sets matters relating to the observation area, the unit time, and the presence or absence of limitation of the observation period of time in accordance with contents that are designated by the user.

Next, a different example of the processing condition setting screen that is illustrated in FIG. 14 is described.

Figure 15:
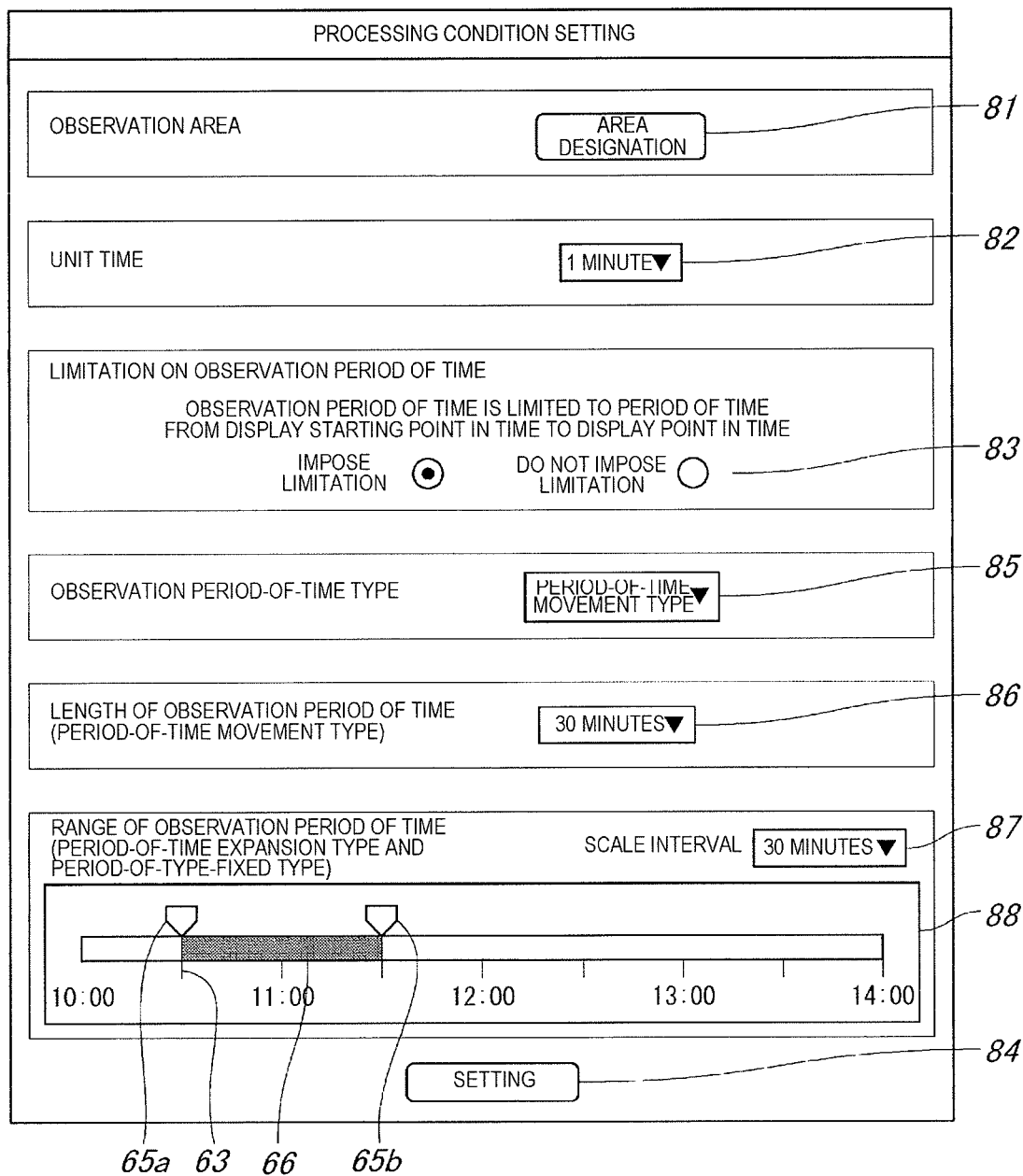
FIG. 15 is an explanatory diagram illustrating a different example of the processing condition setting screen that is illustrated in FIG. 14.

FIG. 15 is an explanatory diagram illustrating the different example of the processing condition setting screen that are illustrated in FIG. 14.

In the example that is illustrated in FIG. 9, on the monitoring screen, the type of observation period of time, and the length and the range of the observation period of time are set to be designated, but in the examples that are illustrated in FIGS. 12A and 12B, on the processing condition setting screen, the type of observation period of time, and the length and the range of the observation period of time are set to be designated. In addition to area setting button 81 that is provided in the processing condition setting screen that is illustrated in FIG. 14, unit time designation section 82, observation period-of-time limitation designation section 83, and setting button 84, observation period-of-time type selection section 85, observation period-of-time length designation section 86, scale regulator 87, and observation period-of-time range designation section 88 are included in processing condition setting screen.

In observation period-of-time type selection section 85, in the same manner as in observation period-of-time type selection section 58 that is illustrated in FIG. 9, the user selects the type of observation period of time (the period-of-time movement type, the period-of-time expansion type, or the period-of-time-fixed type).

In observation period-of-time length designation section 86, the user designates the length of the observation period of time in the period-of-time movement type. Here, the length of the observation period of time is set to be selected from the pull-down menu. The length of the observation period of time may be set to be able to be input as a numerical value.

In observation period-of-time range designation section 88, the user designates the range of the observation period of time in the period-of-time expansion type and the period-of-type-fixed type. Here, in the same manner as in the example that is illustrated in FIG. 9, the user designates the range of the observation period of time with sliders 65a and 65b, and the range of the observation period of time that is specified by sliders 65a and 65b is displayed on observation period-of-time display section 66. In scale regulator 87, the user designates the scale interval of scale 63 of observation period-of-time range designation section 88.

According to the present embodiment described above, the following processing operations are set to be performed. In position information acquirer 32, a person is detected from the moving image of the monitoring area and thus the position information on every person is acquired. In activity information acquirer 34, the activity information is acquired during every unit time based on the position information on every person. In processing condition setter (the observation condition setter) 40, the conditions relating to the observation period of time for observing the activity situation of the person are set according to the user input operation. In observation-period-of-time controller 36, the observation period of time is controlled in accordance with the conditions relating to the observation period of time that is set by processing condition setter 40. In activity information aggregator 37, the activity information during every unit time is aggregated based on the observation period of time that is controlled by observation-period-of-time controller 36 and the activity information is acquired during the observation period of time is acquired. In activity map image generator 38, the activity map image is generated based on the activity information during the observation period of time. In output controller 39, the monitoring moving image including the activity map image and the moving image of the monitoring area is generated at a predetermined point in time and the generated monitoring moving image is output to the display device. For this reason, because the monitoring moving image including the activity map image and the moving image of the monitoring area is generated at a predetermined point in time and the generated monitoring moving image is output, while the moving image of the monitoring area is in the middle of being displayed, the user can easily know how the activation situation of the person changes. Furthermore, because the observation period of time is controlled in accordance with the conditions that are set according to the user input operation, the customization that variously changes the analysis form of the activity situation according to the user need can be easily performed.

Furthermore, according to the present embodiment, in output controller 39, because the monitoring moving image that results from superimposing the activity map moving image onto the moving image of the monitoring area is generated and is output, the user can immediately know the actual situation of the person in the attention-receiving area within the monitoring area and the activity situation of the person.

Furthermore, according to the present embodiment, in observation-period-of-time controller 36, the observation period of time is set to be controlled in such a manner that, according to the progress of the display point in time of the moving image of the monitoring area, the observation period of time moves following the display point in time. For this reason, with the activity map image, the user can know the activity situation of the person during a period of time that is based on the display point in time of the moving image of the monitoring area. When the display point in time progresses by the unit time, the observation period of time is moved by the unit time, and the activity information during the observation period of time is updated, but at this time, processing is only performed that excludes and integrates the activity information during the unit time, which is equivalent to a difference between a new observation period of time and the previous observation period of time, from and into the activity information during the previous observation period of time, and thus the activity information during the new observation period of time can be acquired. Because of this, the arithmetic operation load can be reduced.

Furthermore, according to the present embodiment, in observation-period-of-time controller 36, the observation period of time is set to be controlled in such a manner that, based on the setting length of the observation period of time that is set by processing condition setter (the observation condition setter) 40, the period of time that is by the setting length of the observation period of time earlier than the display point in time of the moving image of the monitoring area is the observation period of time. Because of this, with the activity map image, the user can know the activity situation of the person during the period of time immediately before the moving image of the monitoring area.

Furthermore, according to the present embodiment, in observation-period-of-time controller 36, until the elapsed period of time from the display starting point in time of the moving image of the monitoring area to the display point in time agrees with the setting length of the observation period of time, the observation period of time is set to be controlled in such a manner that the period of time from the display starting point in time to the display point in time is the observation period of time, and the information that is earlier than the display starting point in time of the moving image of the monitoring area is not included in the activity map image. Because of this, the user can suitably know the activity situation of the person during the period of time at an attention-receiving point in time or later.

Furthermore, according to the present embodiment, in observation-period-of-time controller 36, the observation period of time is set to be controlled in such a manner that, based on the setting range of the observation period of time, which is set by processing condition setter (the observation condition setter) 40, within the setting range of the observation period of time, the period of time from the display starting point in time of the moving image of the monitoring area, which is the starting point of the observation period of time, to the display point in time is the observation period of time. For this reason, with the activity map image, the user can know the activity situation of the person that occurs after displaying of the moving image of the monitoring area is started. When the display point in time progresses by the unit time, the observation period of time is moved by the unit time, and the activity information during the observation period of time is updated, but at this time, the activity information during the unit time, which is equivalent to a difference between the previous observation period of time and a new observation period of time, is only integrated into the activity information during the previous observation period of time, and thus the activity information during the new observation period of time can be acquired. Because of this, the arithmetic operation load can be reduced.

Furthermore, according to the present embodiment, in processing condition setter (the observation condition setter) 40, the length or the range of the observation period of time is set according to the user input operation that arbitrarily designates the length or the range of the observation period of time as the conditions of the observation period of time. Because the user can arbitrarily designate the length or the range of the observation period of time, the customization attribute can be improved that changes the analysis form of the activity situation.

Furthermore, according to the present embodiment, in output controller 39, because the monitoring moving image including the activity map image and the current moving image of the monitoring image is generated in real time and is output, the user can browse through the activity map image and the current moving image of the monitoring area in real time.

Furthermore, according to the present embodiment, in processing condition setter (the unit time setter) 40, the unit time is set according to the user input operation, and in activity information acquirer 34, the activity information during every unit time is set to be acquired based on the unit time that is set by processing condition setter 40. Thus, because the user can designate the unit time, the customization attribute can be improved that changes the analysis form of the activity situation.

Second Embodiment

Figure 16A:
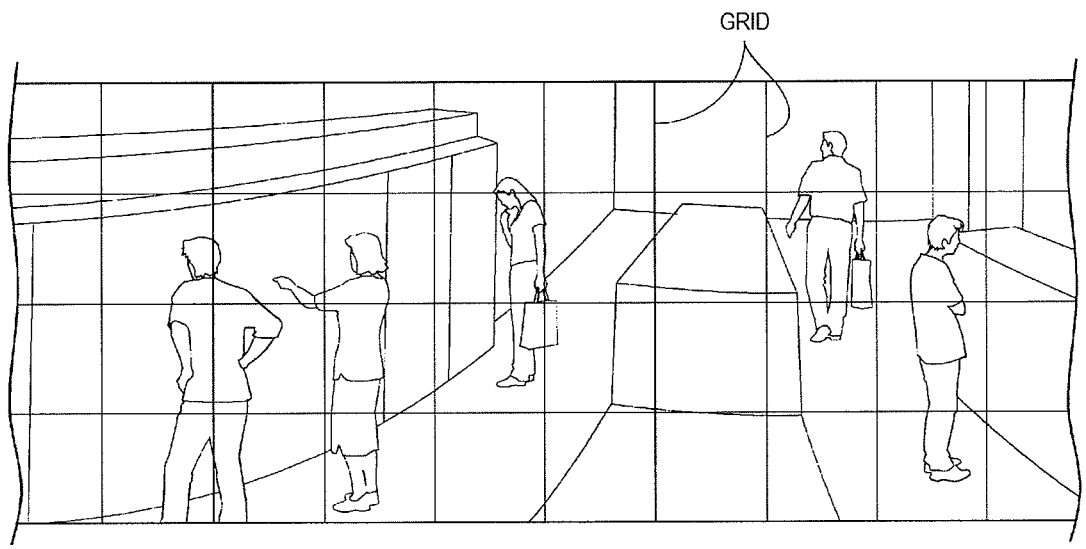
FIG. 16A is an explanatory diagram illustrating the activity map image that is an area division type according to a second embodiment.
Figure 16B:
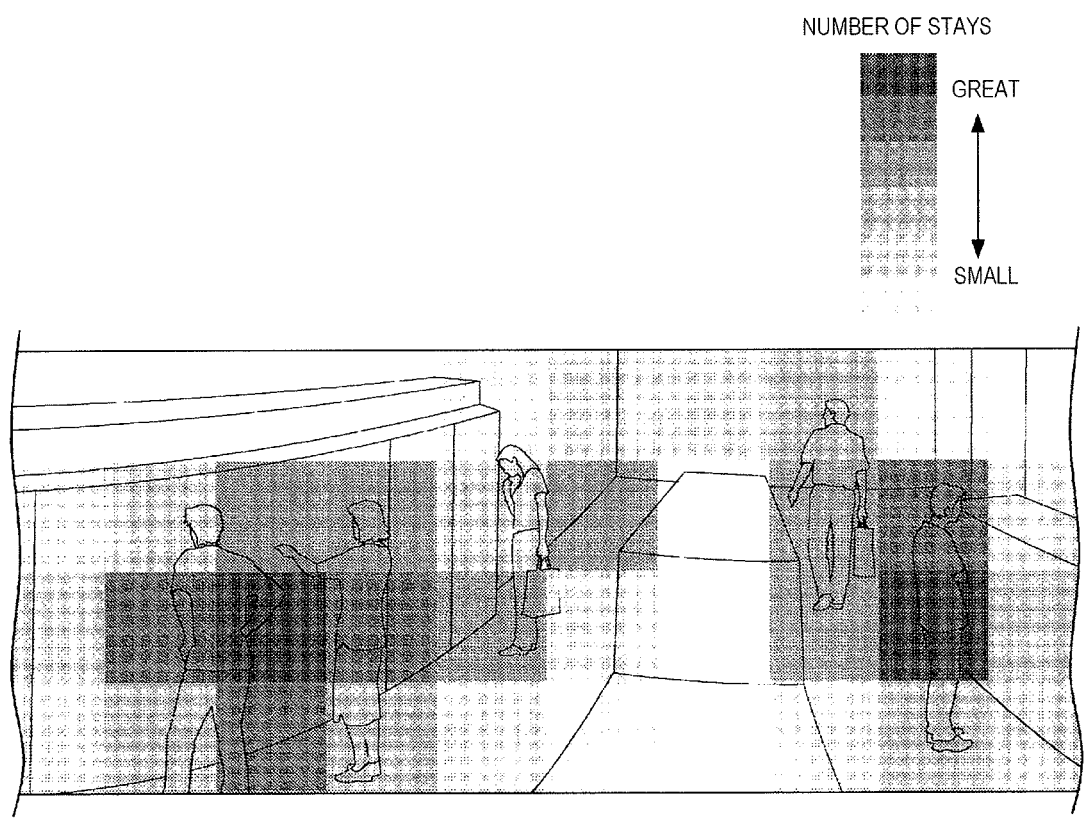
FIG. 16B is an explanatory diagram illustrating the activity map image that is the area division type according to the second embodiment.

Next, a second embodiment is described. What is not described here is the same as in the first embodiment. FIGS. 16A and 16B are explanatory diagrams illustrating the activity map image that is an area division type according to the second embodiment.

According to the first embodiment, as illustrated in FIGS. 3A and 3B, the observation area is set to be within the monitoring area (the moving image of which is captured by camera 1), and the activity map image that results from visualizing the pieces of activity information (the staying time and the number of stays) on every observation area is set to be displayed in a state of being superimposed onto the moving image of the monitoring area. However, according to the second embodiment, as illustrated in FIGS. 16A and 16B, all the monitoring areas are set to be the observation areas, the observation areas are divided into multiple grids (division areas), and the activity map image indicating the activity information on every grid is set to be displayed in the state of being superimposed on the moving image of the monitoring area. With the activity map image, a distribution situation of the activity information in the monitoring area can be known.

Furthermore, in the activity map image that is the area division type, at least one among the display elements that are the color, the intensity, and the pattern (the design), and the transmissivity is changed for every grid, and thus a numerical value of the activity information on every grid can be expressed. In examples that are illustrated in FIGS. 16A and 16B, the number of stays in every grid is expressed with color intensity of the grid (intensity of filling color).

In the activity map images that are illustrated in FIGS. 3A and 3B, the two pieces of activity information, that is, the staying time and the number of stays are visualized with the color intensity of and the size of the activity map image at the same time. On the other hand, in the activity map images that are illustrated in FIGS. 16A and 16B, one piece of activity information, that is, only the number of stays, is visualized, but the activity map image that results from visualizing the staying time instead of the number of stays may be available. Furthermore, the activity map image that results from visualizing each of the staying time and the number of stays may be generated and may be displayed as a different monitoring moving image.

Furthermore, in order to generate the activity map image indicating the number of stays, the number of motion lines of a person that passes each grid during the observation period of time may be counted and the number of stays in every grid may be obtained. Furthermore, if the staying time for which every person stays during the target period of time is acquired in every grid, the staying time and the number of staying persons in every grid can be acquired at the same time. Accordingly, the activity map image indicating the number of stays and the activity map image indicating the staying time can be generated at the same time.

Third Embodiment

Figure 17:
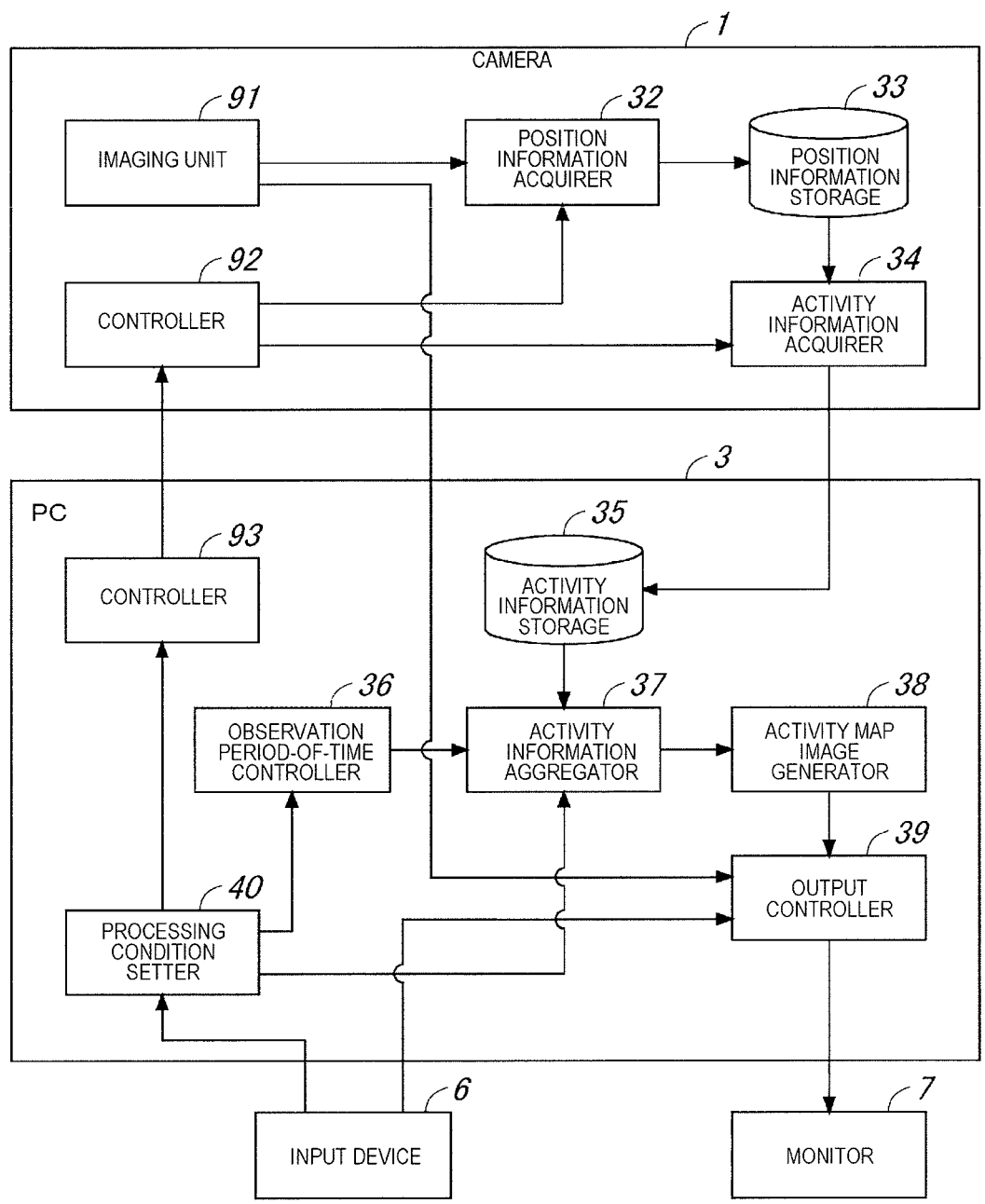
FIG. 17 is a functional block diagram illustrating schematic configurations of the camera and the PC in an activity situation analysis system according to a third embodiment.

Next, a third embodiment is described. What is not described here is the same as in the first embodiment. FIG. 17 is a functional block diagram illustrating schematic configurations of camera 1 and PC 3 in an activity situation analysis system according to the third embodiment.

According to the third embodiment, position information acquirer 32, position information storage 33, and activity information acquirer 34, which, according to the first embodiment, are provided in PC 3, are provided in camera 1. Imaging unit 91 that has imaging elements and optical elements is provided in camera 1, and an image that is output from imaging unit 91 is input into position information acquirer 32. On the other hand, activity information storage 35, observation-period-of-time controller 36, activity information aggregator 37, activity map image generator 38, output controller 39, and processing condition setter 40 are provided in PC 3.

In each unit of camera 1 and PC 3, the same processing as in the first embodiment is performed. However, particularly, according to the third embodiment, the pieces of information that are set in processing condition setter 40, that is, the pieces of information relating to the observation area, the unit time, and the like are sent from controller 93 of PC 3 to controller 92 of camera 1. Based on these pieces of information, predetermined processing is performed in each of position information acquirer 32 and activity information acquirer 34. It is possible to make various changes to a configuration in which constituent elements are mounted in camera 1 and PC 3. Most of the constituent elements are mounted in camera 1. Only the processing condition setting and output control of the monitoring moving image may be set to be performed from PC 3 using a browser.

The present invention is described above based on the specific embodiments, but these embodiments are only examples, and the present invention is not limited by these embodiments. Furthermore, all constituent elements of each of the activity situation analysis apparatus, the activity situation analysis system, and the activity situation analysis method according to the embodiments described above, of the present invention, are not necessarily essential, and it is possible to make a selection from among the all constituent elements within a range that does not depart from the scope of the present invention.

For example, according to the embodiments described above, an example of a retail store such as a convenience store is described, but the present invention is not limited to this retail store, and is also applicable to stores that are different from the retail store in terms of types of business, for example, such as a restaurant and a bank. Additionally, it is also possible to apply the present invention to the use in monitoring areas other than the store.

Furthermore, according to the embodiments, an example is described above in which the moving object that is a target for the activity situation analysis processing is defined as a person, but moving objects other than the person, for example, vehicles such as an automobile and a bicycle, may be targets for the activity situation analysis processing.

Furthermore, according to the embodiments described above, as illustrated in FIG. 2, camera 1 is set to be an omnidirectional camera with a fish-eye lens that has a photographing range of 360 degrees, but it is also possible to adopt a camera with a predetermined angle of view, which is called a box camera.

Furthermore, according to the embodiments described above, as illustrated in FIG. 9 and other figures, the display point in time of the moving image and the length and the range (the points in time of the starting point and of the ending point of the observation period of time) of the observation period of time are set to be designated by sliders 64, 65*a*, and 65*b*, but the display forms of sliders 64, 65*a*, and 65*b* are not limited to the examples that are illustrated in FIG. 9 and other figures. Various display forms can be employed. Additionally, in addition to being designated by the sliders, the display point in time and the length and the range of the observation period of time may be set to be designated by a selection from a selection menu or by direct input of a numerical value.

Furthermore, according to the embodiments described above, as illustrated in FIGS. 3A, 3B, 16A, and 16B, the monitoring moving image that results from superimposing the activity map image onto the moving image of the monitoring area is set to be displayed, but the activity map image may not be superimposed onto the moving image of the monitoring area. That is, the activity map image and the moving image of the monitoring area may be set to be displayed side by side on the monitoring screen.

Furthermore, according to the embodiments described above, the pieces of staying information (the staying time and the number of stays (the number of staying persons)) indicating the staying situation of the moving object are set to be acquired as the activity information indicating the activity situation of the moving object in the monitoring area, but the activity information is not limited to the pieces of staying information. Pieces of information indicating various degrees of activity can be acquired and thus the activity map image can be generated. Furthermore, both of the staying time and the number of stays as the activity information are set to be acquired, and the activity map image that expresses both of the staying time and the number of stays is set to be displayed, but only one of the staying time and the number of stays may be set to be acquired and the activity map image that expresses only one of the staying time and the number of stays may be set to be displayed.

Furthermore, according to the embodiments described above, the motion line of the person is set to be acquired and the pieces of activity information (the staying time and the number of stays) are set to be acquired based on the motion line, but this activity information acquirement processing is not limited to the activity information that is based on the motion line. For example, coordinate information relating to a person frame (a rectangular area in which a person is present) may be set to be acquired as the position information on the person, the number of times that every pixel (a detection element) is positioned within the person frame may be set to be counted, a count value of every pixel may be set to be acquired, suitable statistical processing, for example, averaging, may be set to be performed on the count value of every pixel for aggregation in units of observation areas (refer to FIGS. 3A and 3B) or in units of grids (refer to FIGS. 16A and 16B), and thus the activity information on every observation area or on every grid may be set to be acquired. Furthermore, coordinate information relating to a central point of the person frame may be set to be acquired, the number of times that the central point of the person frame is positioned within the observation area or the grid may be set to be counted, and thus the activity information on every observation area or on every grid may be set to be acquired.

Furthermore, according to the first embodiment, PC 3 that is provided in the store is set to be caused to perform the processing necessary for the activity situation analysis, but PC 11 that is provided in the head office or cloud computer 12 that makes up a cloud computing system, as illustrated in FIG. 1, may be set to be caused to perform the necessary processing. Furthermore, the necessary processing may be shared among multiple information processing apparatuses, and information may be set to be received in multiple information processing apparatuses over a communication medium such as an IP network or a LAN. In this case, the activity situation analysis system is configured from the multiple information processing apparatuses that share the necessary processing.

With this configuration, among processing operations necessary for the activity situation analysis, an apparatus that is provided in the store such as PC 3 or camera 1 may be set to be caused to perform processing that requires at least a large amount of computing, for example, person detection processing. With this configuration, because an amount of necessary information data is reduced in remaining processing, even if an information processing apparatus that is installed in a place other than the store, for example, PC 11 that is provided in the head office is set to be caused to perform the remaining processing, communication load can be reduced. Because of this, management of the system using a wide area network connection type is made easy.

Furthermore, among the processing operations necessary for the activity situation analysis, cloud computer 12 may be set to be caused to perform the processing that requires at least a large amount of computing, for example, the person detection processing. With this configuration, an amount of computing is reduced in the remaining processing, a high-speed information processing apparatus is unnecessary on the user side such as the store, and a user-borne cost can be reduced.

Furthermore, cloud computer 12 may be set to be caused to perform all necessary processing operations, or among the necessary processing operations, cloud computer 12 may be set to be caused to share at least image output processing. With this configuration, in addition to PCs 3 and 11 that are provided in the store and the head office, respectively, an image can be displayed on a portable terminal such as smart phone 13 or tablet terminal 14, and thus a situation that occurs within the store can be checked in an arbitrary place such as a visiting destination other than the store or the head office.

Furthermore, according to the present embodiment, a case where PC 3 that is installed in the store is caused to perform the processing necessary for the activity situation analysis, the monitoring screen or the processing condition setting screen is caused to be displayed on monitor 7 of PC 3, and necessary input and output are performed on PC 3 is described, but the necessary input and output may be set to be performed in an information processing apparatus that is separate from the information processing apparatus that performs the processing necessary for the activity situation analysis, for example, in a portable terminal such as PC 11 installed in the head office or tablet PC 14.

The activity situation analysis apparatus, the activity situation analysis system, and the activity situation analysis method according to the present invention, are useful as the activity situation analysis apparatus, the activity situation analysis system, and the activity situation analysis method, respectively, each of which enables the user to easily know how the activity situation of the moving object changes while the moving image of the monitoring area is displayed, has an effect that the customization can be easily performed which variously changes the analysis form of the activity situation according to the user need, observes the activity situation of the moving object in the monitoring area, generates the activity map image that results from visualizing the activity situation of the moving object, based on a result of the observation, and displays the generated activity map image on the display device.

What is claimed is:

1. An activity situation analysis apparatus that observes an activity situation of a moving object in a monitoring area, generates an activity map image that results from visualizing the activity situation of the moving object based on a result of the observation, and displays the generated activity map image on a display device, the activity situation analysis apparatus comprising:
   a memory in which an instruction is stored;
   a processor that
      detects the moving object from a moving image of the monitoring area and acquires position information on a plurality of moving objects including the moving object;
      acquires activity information based on the position information on the plurality of moving objects;
      accepts setting conditions relating to an observation period of time for observing activity situation of the moving object whether the observation period of time is fixed or the observation period of time is changed in such a manner that, according to a progress of a display point in time of the moving image of the monitoring area, the observation period of time moves following the display point in time;
      controls the observation period of time in accordance with the conditions relating to the observation period of time that is set;
      aggregates the activity information based on the observation period of time that is controlled, and acquires the activity information during the observation period of time;
      generates the activity map image based on the activity information during the observation period of time, the activity map image includes a first indicator to indicate a stay time and a second indicator to indicate a number of stays, and an area of the first indicator and an area of the second indicator overlap at least in part to provide a combination of information pertaining to the first indicator and the second indicator;
      generates a monitoring moving image including the activity map image and the moving image of the monitoring area at every predetermined point in time, and outputs the generated monitoring moving image to the display device;
      after the monitoring moving image is outputted, modifies the observation period of time to provide a new observation period of time;
      acquires additional activity information during a difference period between the observation period of time and the new observation period of time; and
      update the activity information with the additional activity information acquired during the difference period to reflect combined activity information during the observation period of time and the difference period without reprocessing the activity information of the observation period of time,
   wherein, in a case where the processor accepts setting one of the conditions as the observation period of time being fixed, the activity map image included in the monitoring moving image is not changed at every predetermined point in time, and
   wherein one of the first indicator and the second indicator is displayed as a geometric shape of varying size, and other of the first indicator and the second indicator is displayed as different shades of a color.

2. The activity situation analysis apparatus of claim 1, wherein the processor generates the monitoring moving image that results from superimposing the activity map image onto the moving image of the monitoring area, and outputs the generated monitoring moving image.

3. The activity situation analysis apparatus of claim 1, wherein the processor controls the observation period of time in such a manner that, according to the progress of the display point in time of the moving image of the monitoring area, the observation period of time moves following the display point in time.

4. The activity situation analysis apparatus of claim 3, wherein the processor controls the observation period of time in such a manner that, based on a setting length of the observation period of time that is set, a period of time that is set by the setting length of the observation period of time earlier than the display point in time of the moving image of the monitoring area is the observation period of time.

5. The activity situation analysis apparatus of claim 4, wherein the processor controls the observation period of time in such a manner that a period of time from a display starting point in time to the display point in time is the observation period of time until an elapsed period of time from the display starting point in time of the moving image of the monitoring area to the display point in time reaches the setting length of the observation period of time.

6. The activity situation analysis apparatus of claim 1, wherein the processor controls the observation period of time in such a manner that, based on a setting range of the observation period of time, which is set, within the setting range of the observation period of time, a period of time from the display starting point in time of the moving image of the monitoring area, which is a starting point of the observation period of time, to a display point in time is the observation period of time.

7. The activity situation analysis apparatus of claim 1, wherein the processor sets a length of or a range of the observation period of time according to the user input operation that arbitrarily designates the length of or the range of the observation period of time as conditions of the observation period of time.

8. The activity situation analysis apparatus of claim 1, wherein the processor generates the monitoring moving image including the activity map image and a current moving image of the monitoring area in real time, and outputs the generated monitoring moving image.

9. The activity situation analysis apparatus of claim 1, wherein the processor further sets a unit time relating to the acquisition of the activity information according to a user input operation, and
wherein the processor acquires the activity information on every unit time based on the unit time that is set.

10. The activity situation analysis apparatus of claim 1, wherein the activity information includes information relating to at least either of a number of stays that is a number of moving objects that stay in an observation area that is set to be within the monitoring area and a staying time that is a time for which the moving object stays within the observation area.

11. The activity situation analysis apparatus of claim 1,
wherein the processor acquires the activity information based on the position information of the plurality of moving objects per a unit time, and
wherein the processor acquires the activity information during the observation period of time by aggregating the activity information acquired for units of time corresponding to the observation period of time.

12. The activity situation analysis apparatus of claim 1,
wherein, in a case where the processor accepts setting one of the conditions as the observation period of time being changed, the activity map image included in the monitoring moving image is updated at every predetermined point in time, and
wherein, when the observation period of time is changed, an observation duration remains same during observation, but corresponding start time and end time are updated at the every predetermined point in time and are not predetermined.

13. The activity situation analysis apparatus of claim 12,
wherein a first observation period of time and a second observation period of time partially overlap one another, such that a start time of the second observation period is during the first observation period.

14. An activity situation analysis system that observes an activity situation of a moving object in a monitoring area, generates an activity map image that results from visualizing the activity situation of the moving object based on a result of the observation, and displays the generated activity map image on a display device,
the activity situation analysis system comprising:
a camera that captures a moving image of the monitoring area; and
multiple information processing apparatuses,
wherein any one of the multiple information processing apparatuses includes
a memory in which an instruction is stored, and
a processor that:
detects the moving object from the moving image of the monitoring area and acquires position information on a plurality of moving objects including the moving object,
acquires activity information based on the position information on the plurality of moving objects,
accepts setting conditions relating to an observation period of time for observing activity situation of the moving object whether the observation period of time is fixed or the observation period of time is changed in such a manner that, according to a progress of a display point in time of the moving image of the monitoring area, the observation period of time moves following the display point in time,
controls the observation period of time in accordance with the conditions of the observation period of time that is set,
aggregates the activity information based on the observation period of time that is controlled, and acquires the activity information during the observation period of time,
generates the activity map image based on the activity information during the observation period of time, the activity map image includes a first indicator to indicate a stay time and a second indicator to indicate a number of stays, and an area of the first indicator and an area of the second indicator overlap at least in part to provide a combination of information pertaining to the first indicator and the second indicator,
generates a monitoring moving image including the activity map image and the moving image of the monitoring area at every predetermined point in time, and outputs the generated monitoring moving image to the display device,
after the monitoring moving image is outputted, modifies the observation period of time to provide a new observation period of time,
acquires additional activity information during a difference period between the observation period of time and the new observation period of time, and
update the activity information with the additional activity information acquired during the difference period to reflect combined activity information during the observation period of time and the difference period without reprocessing the activity information of the observation period of time,
wherein, in a case where the processor accepts setting one of the conditions as the observation period of time being fixed, the activity map image included in the monitoring moving image is not changed at every predetermined point in time, and
wherein one of the first indicator and the second indicator is displayed as a geometric shape of varying size, and other of the first indicator and the second indicator is displayed as different shades of a color.

15. An activity situation analysis system that observes an activity situation of a moving object in a monitoring area, generates an activity map image that results from visualizing the activity situation of the moving object based on a result of the observation, and displays the generated activity map image on a display device, the activity situation analysis system comprising:
a camera that captures a moving image of the monitoring area; and
an information processing apparatus,
wherein any one of the camera and the information processing apparatus includes,
a processor that
detects the moving object from the moving image of the monitoring area and acquires position information on a plurality of moving objects including the moving object,
acquires activity information based on the position information on the plurality of moving objects,
accepts setting conditions relating to an observation period of time for observing activity situation of the moving object whether the observation period of time is fixed or the observation period of time is changed in such a manner that, according to a progress of a display point in time of the moving image of the monitoring area, the observation period of time moves following the display point in time,
controls the observation period of time in accordance with the conditions of the observation period of time that is set,
aggregates the activity information based on the observation period of time that is controlled, and acquires the activity information during the observation period of time,
generates the activity map image based on the activity information during the observation period of time, the activity map image includes a first indicator to indicate a stay time and a second indicator to indicate a number of stays, and an area of the first indicator and an area of the second indicator overlap at least in part to provide a combination of information pertaining to the first indicator and the second indicator, generates a monitoring moving image including the activity map image and the moving image of the monitoring area at every predetermined point in time, and outputs the generated monitoring moving image to the display device, after the monitoring moving image is outputted, modifies the observation period of time to provide a new observation period of time, acquires additional activity information during a difference period between the observation period of time and the new observation period of time, and update the activity information with the additional activity information acquired during the difference period to reflect combined activity information during the observation period of time and the difference period without reprocessing the activity information of the observation period of time, wherein, in a case where the processor accepts setting one of the conditions as the observation period of time being fixed, the activity map image included in the monitoring moving image is not changed at every predetermined point in time, and wherein one of the first indicator and the second indicator is displayed as a geometric shape of varying size, and other of the first indicator and the second indicator is displayed as different shades of a color.

16. An activity situation analysis method of causing an information processing apparatus to perform processing that observes an activity situation of a moving object in a monitoring area, generates an activity map image that results from visualizing the activity situation of the moving object based on a result of the observation, and displays the generated activity map image on a display device, wherein an instruction that is executed by a processor of the information processing apparatus and that is stored in a memory includes, detecting the moving object from a moving image of the monitoring area and acquiring position information on a plurality of moving objects including the moving object, acquiring activity information based on the position information on the plurality of moving objects, accepting setting conditions relating to an observation period of time for observing activity situation of the moving object whether the observation period of time is fixed or the observation period of time is changed in such a manner that, according to a progress of a display point in time of the moving image of the monitoring area, the observation period of time moves following the display point in time, controlling the observation period of time in accordance with the conditions relating to the observation period of time that is set, aggregating the activity information based on the observation period of time that is controlled and acquiring the activity information during the observation period of time, generating the activity map image based on the activity information during the observation period of time, the activity map image includes a first indicator to indicate a stay time and a second indicator to indicate a number of stays, and an area of the first indicator and an area of the second indicator overlap at least in part to provide a combination of information pertaining to the first indicator and the second indicator, generating a monitoring moving image including the activity map image and the moving image of the monitoring area at every predetermined point in time and outputting the generated monitoring moving image to the display device, modifying, after the monitoring moving image is outputted, the observation period of time to provide a new observation period of time, acquiring additional activity information during a difference period between the observation period of time and the new observation period of time, and updating the activity information with the additional activity information acquired during the difference period to reflect combined activity information during the observation period of time and the difference period without reprocessing the activity information of the observation period of time, wherein, in a case where the processor accepts setting one of the conditions as the observation period of time being fixed, the activity map image included in the monitoring moving image is not changed at every predetermined point in time, and wherein one of the first indicator and the second indicator is displayed as a geometric shape of varying size, and other of the first indicator and the second indicator is displayed as different shades of a color.

* * * * *